United States Patent [19]

Schliemann et al.

[11] Patent Number: 4,594,780
[45] Date of Patent: Jun. 17, 1986

[54] BRAKE ARRANGEMENT FOR A CHAIN SAW

[75] Inventors: Harald Schliemann, Waiblingen; Michael Wissmann, Markgröningen; Hans Nickel, Cottenweiler, all of Fed. Rep. of Germany

[73] Assignee: Andreas Stihl, Waiblingen, Fed. Rep. of Germany

[21] Appl. No.: 628,655

[22] Filed: Jul. 6, 1984

[30] Foreign Application Priority Data

Jul. 8, 1983 [DE] Fed. Rep. of Germany ....... 3324628
May 23, 1984 [DE] Fed. Rep. of Germany ....... 3419152

[51] Int. Cl.$^4$ .................. B27B 17/00; F16D 49/04
[52] U.S. Cl. .......................... 30/382; 74/2; 188/77 R; 188/166
[58] Field of Search .............. 188/77 R, 77 W, 166; 30/381, 382; 74/2

[56] References Cited

U.S. PATENT DOCUMENTS 3,923,126 12/1975 Bidanset .................... 188/166 X
4,370,810 2/1983 Schurr et al. ................. 30/382

FOREIGN PATENT DOCUMENTS 666935 10/1929 France .................... 188/77 R

*Primary Examiner*—Bruce H. Stoner, Jr.
*Assistant Examiner*—Richard R. Diefendorf
*Attorney, Agent, or Firm*—Walter Ottesen

[57] ABSTRACT

The invention is directed to a braking arrangement for a chain saw having a housing and a guide bar mounted on the housing for accommodating a saw chain thereon. The brake arrangement includes a brake drum operatively connected to the saw chain with a brake band disposed in surrounding relationship thereto. A brake member is connected to the brake band and moves between a ready position whereat the brake band is disposed in spaced relationship to the brake drum and a released position whereat the brake band is drawn tightly around the brake drum. A brake spring resiliently biases the brake member to cause the brake member to pull the brake band tightly about the brake drum when in the released position. A latch arrangement holds the brake member in the ready position against the force of the brake spring. A cam connected to the drive motor rotates through a predetermined path. A release device opens the latch arrangement to permit rotational movement of the brake member to the released position and releases a tensioning member for movement into the path of the cam when the brake member is in the second position whereat the tensioning member follows the cam in a movement that causes the tensioning member to again coact with the latch arrangement to return the brake member to the ready position and to reclose the latch arrangement whereby the latter again holds the brake member in the ready position against the force of the brake spring.

24 Claims, 24 Drawing Figures

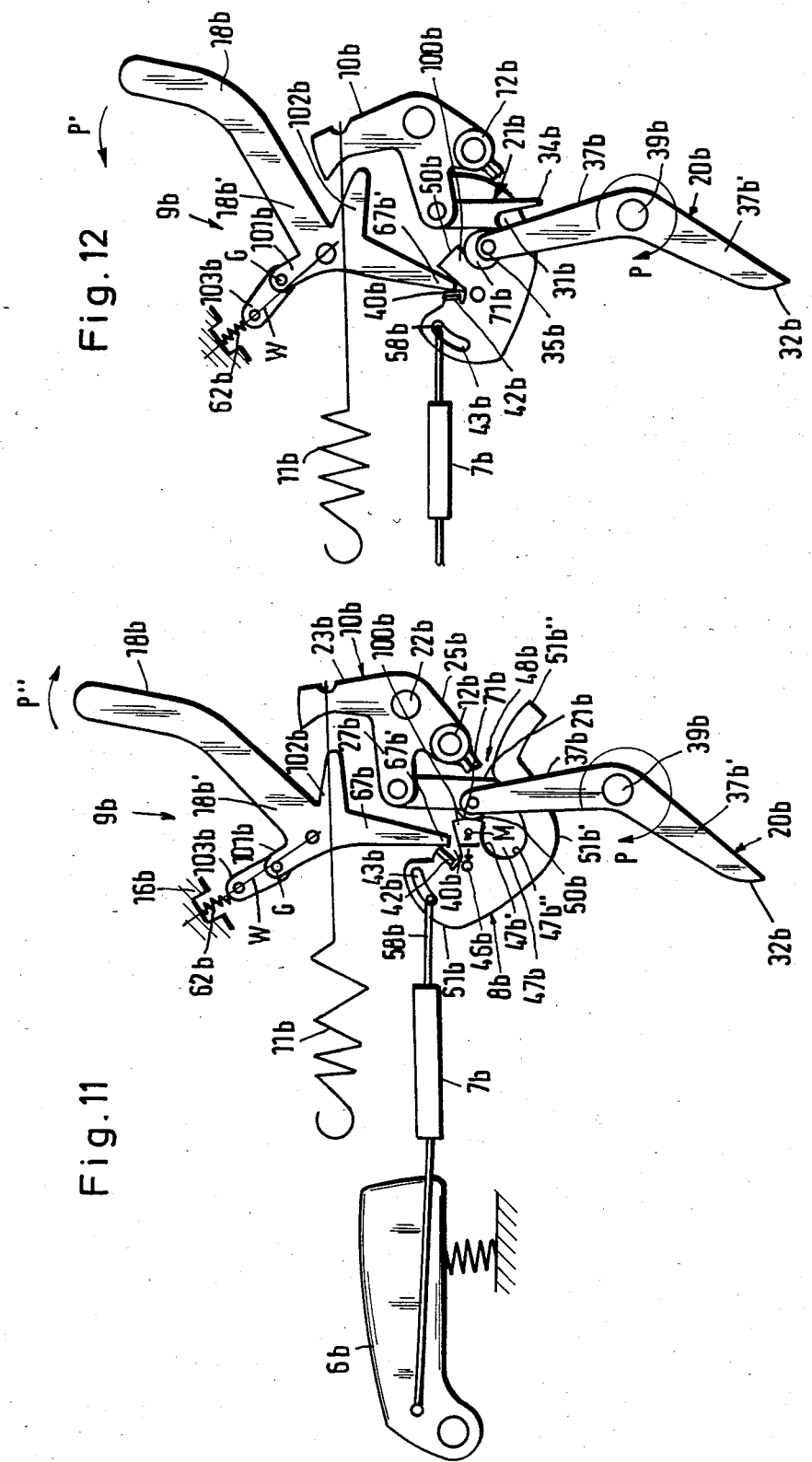

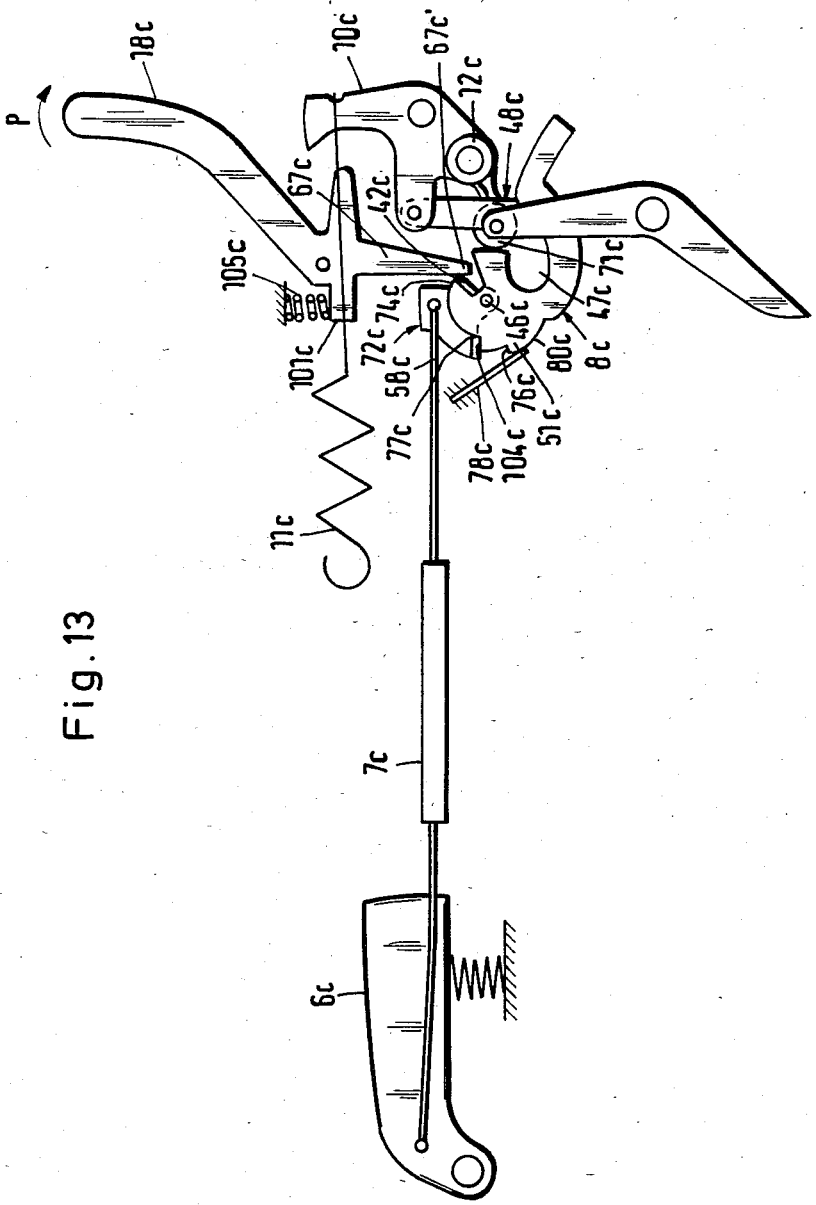

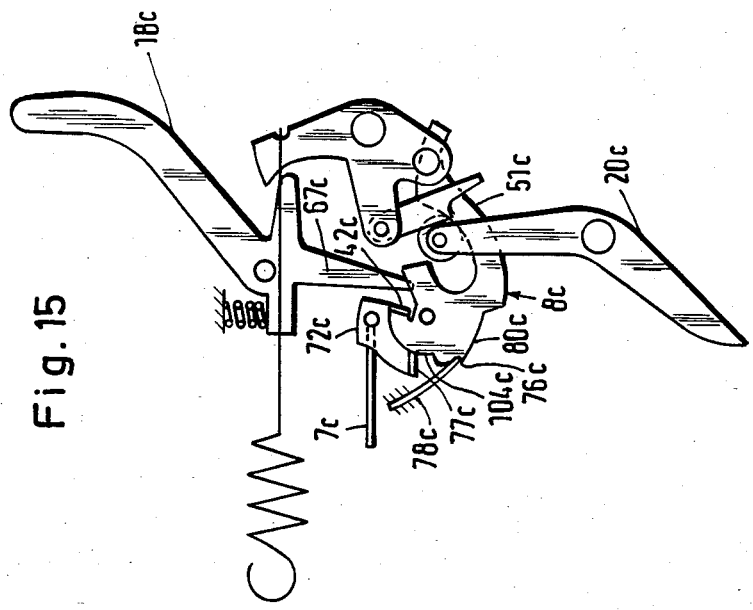
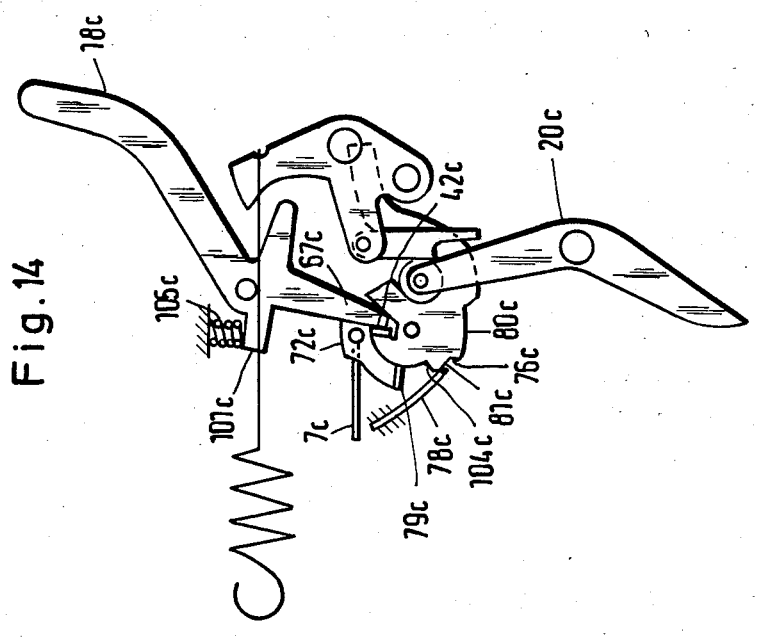

4,594,780

BRAKE ARRANGEMENT FOR A CHAIN SAW

FIELD OF THE INVENTION

The invention relates to a brake arrangement for a chain saw. The brake arrangement includes a release device operatively connected to a brake member and a tensioning member. A brake band is disposed in surrounding relationship to a brake drum and is connected to the brake member. The brake member is also connected to a brake spring and is held in the ready position by a latching arrangement against the force of the spring.

BACKGROUND OF THE INVENTION

In known braking arrangements, the release member is a hand-guard lever which pivots when the chain saw is thrown rearwardly as in the kickback situation. This action causes the latching arrangement between the brake member and tensioning member to release and the brake band is applied to the brake drum under the force applied to the brake lever. To lift the brake band from the brake drum, that is, to reset the braking arrangement to its ready condition, the hand-guard lever must be pressed manually against the force of the brake spring to return it to its ready position. Since the brake spring is relatively strong, a very substantial effort is required to pivot the hand-guard lever so that lifting the brake band from the brake drum and placing the brake band in its ready position is difficult and inconvenient.

Since the person operating the chain saw must take a hand from the handle, each resetting operation will cause the work performed by the operator to be interrupted. In some circumstances, the operator's strength in one hand may not be sufficient to reset the braking arrangement so that the chain saw must be placed on an appropriate surface such as the ground where it can be braced.

The stream of work can be interrupted especially often and for a relatively long time if the braking arrangement is released at time intervals which follow rapidly one after the other. This is especially the case if the chain saw is also equipped with the so-called two-hand safety arrangement. More specifically, a signal can be provided which releases the braking arrangement if the operating person removes one hand from one of the chain saw handles. With such additional danger signals, false releases of the braking arrangement occur far more frequently so that the hand-guard lever must be pivoted to its ready position after each false release which is very time consuming and saps the strength of the operator.

SUMMARY OF THE INVENTION

It is an object of the invention to provide a braking arrangement for a chain saw wherein the braking member and the brake spring can be recharged to return the arrangement to the ready condition quickly and simply without a significant interruption in the work performed by the operator.

The braking arrangement of the invention is for a chain saw having a housing and a guide bar mounted on the housing for accommodating a saw chain thereon. The chain saw also has a drive motor mounted in the housing.

The brake arrangement according to the invention includes a brake drum operatively connected to the saw chain; a brake band disposed in surrounding relationship to the brake drum; a brake member connected to the brake band and pivotally mounted on the housing for movement between a ready position whereat the brake band is disposed in spaced relationship to the brake drum and a released position whereat the brake band is drawn tightly around the brake drum; a brake spring connected to the brake member for resiliently biasing the brake member in a direction to cause the brake member to pull the brake band tightly about the brake drum when the brake member is in the released position; latching means for holding the brake member in the ready position against the force of the brake spring; the latching means including a tensioning member pivotally mounted on the housing; cam means connected to the drive motor for rotational movement through a predetermined path; and, release means operatively connected to the latching means for opening the same to permit rotational movement of the brake member to the released position in response to a first actuation of the release means and for releasing the tensioning member in response to a second actuation of said release means for movement of said tensioning member into the path after the brake member is in the released position in which path the tensioning member follows the cam means in a movement that causes the tensioning member to again coact with the latching means to return the brake member to the ready position and to reclose the latch means whereby the latter again holds the brake member in the ready position against the force of the brake spring.

As a consequence of the braking arrangement of the invention, the brake member must no longer be moved to its ready position manually. Rather, it is placed in its ready position by the operation of the motor of the chain saw. For this purpose, no special strength of the operator is required. The apparatus equipped with a braking arrangement of the invention can be returned to its operating condition simply and in a short time so that the stream of work performed by the operator is not interrupted by frequent braking actions.

Because of this simple resetting of the brake band, a precondition is achieved with the invention that, with the exception of a pure kickback braking action, any desired number of further danger signals can be evaluated without placing unacceptable burdens on the operator. For example, a suitable danger signal to release the braking arrangement is when the operator removes a hand from one of the two handles of the chain saw which can, for example, have respective release members which are depressed when the handles are grasped.

Furthermore, to achieve a release of the braking arrangement, one of the release members arranged in the rear handle can be released and, to return the braking arrangement to the ready position, it is merely required that the release member again be pressed. With such additional danger signals of the kind mentioned above, the danger of injury is substantially reduced. Finally, the braking arrangement of the invention can be also expanded to an automatic kickback braking arrangement if, for example, the hand-brake lever serves as the release member.

BRIEF DESCRIPTION OF THE DRAWINGS

The invention will now be described with reference to the drawing wherein:

FIG. 2a shows a portion of the latching device of the braking arrangement of FIG. 2 wherein a portion of the tensioning lever has been omitted for clarity;

FIG. 2b is a side elevation view of the end portion of one arm of the tensioning lever when viewed in the direction of arrow IIb of FIG. 2;

FIG. 11 is an enlarged schematic of the braking arrangement shown in FIG. 10;

FIG. 12 is an enlarged schematic of the braking arrangement of FIG. 11 shown with the brake released by actuation of the hand-guard lever;

FIG. 13 is an enlarged schematic representation of another embodiment of the braking arrangement of the invention shown in the ready condition;

FIG. 14 is a schematic of the braking arrangement of FIG. 13 shown shortly after a completed release of the hand-guard lever;

FIG. 15 is a schematic showing the braking arrangement of FIG. 14 in the braking position; however, with a release device pivotally returned to the ready position and with an actuation member latched by means of a latching arrangement;

DESCRIPTION OF THE PREFERRED EMBODIMENTS OF THE INVENTION

Figure 1:
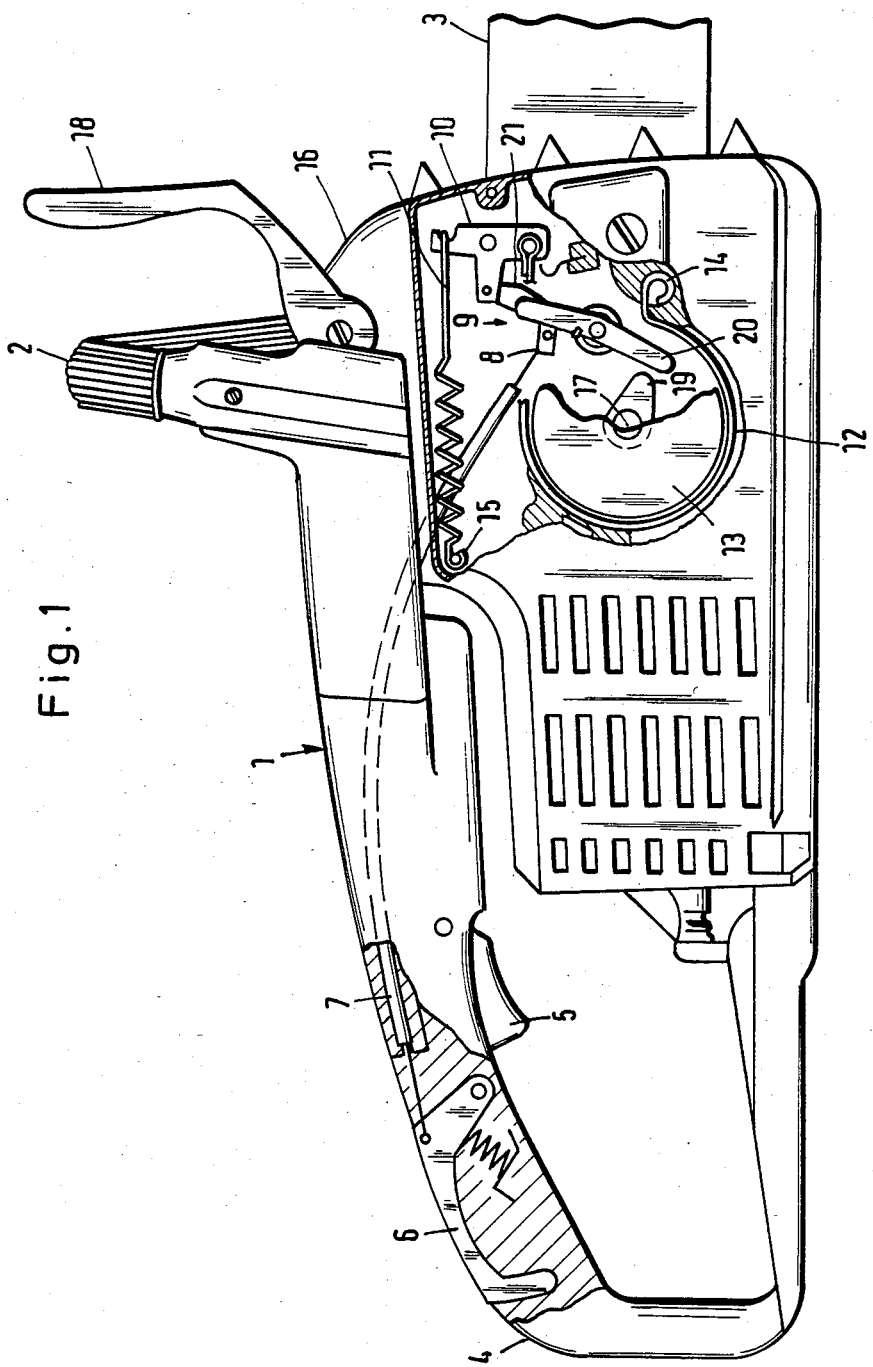
FIG. 1 is a side elevation view of a chain saw wherein the side wall of the housing thereof has been partially broken out to reveal the braking arrangement according to the invention shown in its ready condition and for which a release device is actuable to release the braking arrangement.

FIG. 1 shows a chain saw 1 having a front handle 2 disposed so as to be transverse to a guide bar 3 for guiding a saw chain (not shown) around the periphery thereof and a rear handle 4 arranged parallel to the guide bar 3. A hand-guard lever 18 is pivotally mounted between the guide bar 3 and the front handle 2. The hand-guard lever 18 extends parallel to the front handle 2. A throttle lever 5 and a pivotally mounted release lever 6 are arranged in the rear handle 4 with the throttle lever 5 being arranged to project downwardly below the upper leg of the handle and the release lever 6 being arranged to project upwardly from the upper side of this leg. The release lever 6 is connected to the actuating lever 8 of a chain brake arrangement 9 by means of a control cable disposed in a flexible steel conduit or Bowden control cable 7.

The braking arrangement 9 includes a brake lever 10 which is connected to a brake spring 11 configured as a tension spring and a brake band 12. The brake band 12 is disposed in surrounding relationship to the brake drum 13 of the chain saw 1. Both the brake band 12 and the brake spring 11 are securely fastened to housing 16 of the chain saw 1 with their respective ends 14 and 15 facing away from the lever 10. The brake drum 13 surrounds a crank shaft 17 connected to the motor (not shown) of the chain saw 1. The crank shaft 17 carries a cam-shaped member or cam 19 for coacting with a tensioning member 20 of the braking arrangement 9. The tensioning member is configured as a tensioning lever 20. The cam 19 has an approximately elliptical outline and a narrow edge which arcuately surrounds the cam axis 56 to define a quarter circle cam segment 57 at one end of the cam. The cam tapers and extends to the cam apex 59. The movement of the cam first begins after the upper dead center position of the crank shaft so that the tensioning process will take place during the power stroke of the crank shaft.

Figure 2:
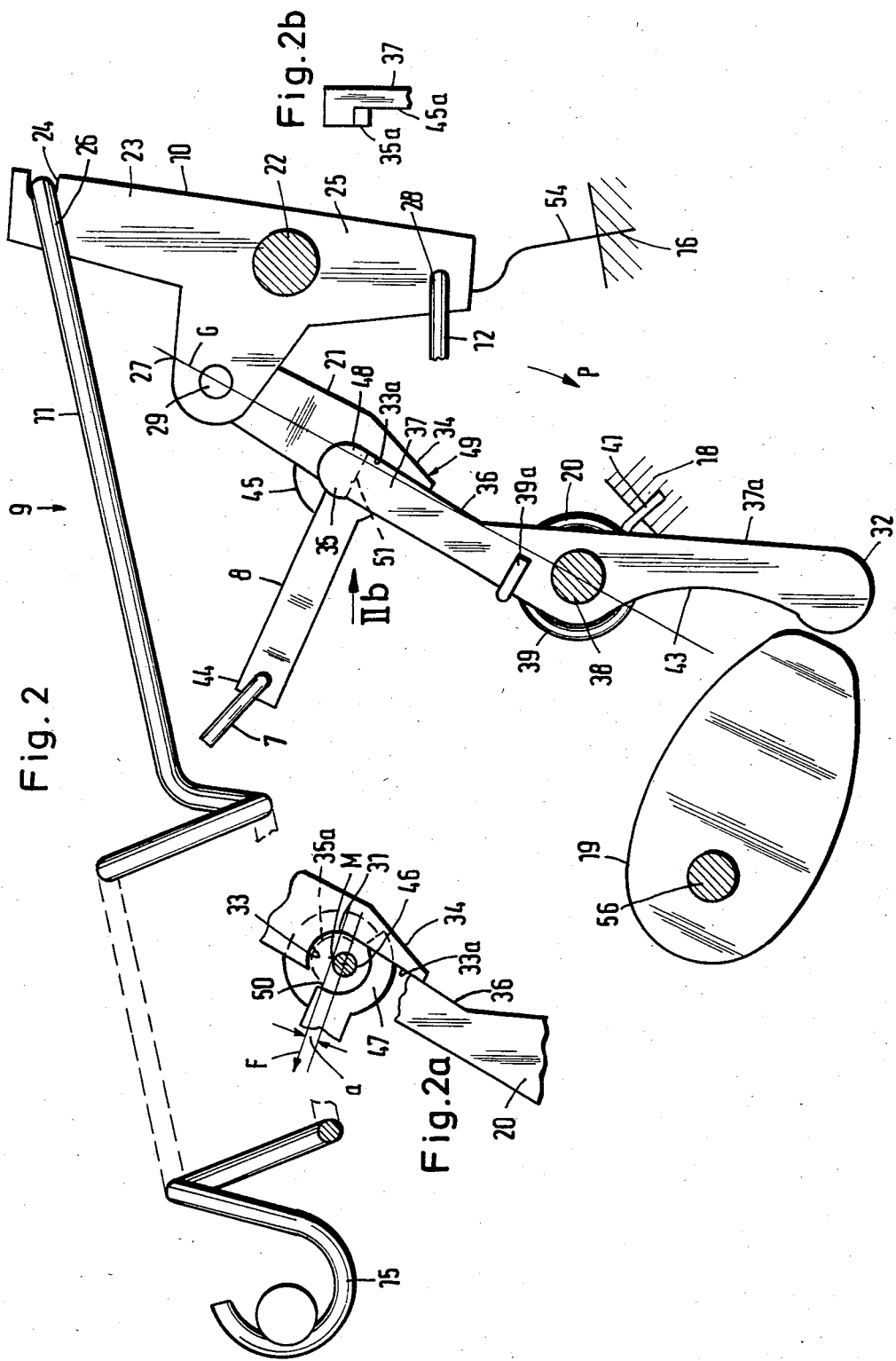
FIG. 2 is an enlarged schematic showing the braking arrangement.

In the ready position shown in FIGS. 1 and 2, the tensioning lever 20 is latched via an intermediate lever 21 with the brake lever 10. As shown especially in FIG. 2, the brake lever 10 is configured as a three-arm angle lever pivotally mounted on an axis 22 fixed to the housing. Arm 23 shown projecting upwardly has a slot 24 formed in the edge thereof for accommodating the other end 26 of the brake spring 11 and is somewhat longer than the second arm 25 projecting downwardly. End 28 of the brake band 12 is hooked into arm 25 of the brake lever 10. The third arm 27 of brake lever 10 extends approximately perpendicularly to the other two arms 23 and 25 and is disposed at approximately halfway between these two arms. An intermediate lever 21 is connected to the free end of the third arm 27 so as to be freely pivotable with respect thereto.

Referring to FIG. 2a, the free end of intermediate lever 21 is notched to define a finger-like projection 34. The notch opening 31 is defined by a circular portion 5 and a linear portion 33a. The notch 31 and the linear outer edge 33a are fitted to the form of the corresponding end 35 of the tensioning lever 20 in such a manner that the notch 31 surrounds the rounded end 35 of the tensioning lever 20 in a form-tight manner and that the linear portion 33a of the finger-like projection 34 contactingly engages the longitudinally extending linear edge 36 of a first arm 37 of the tensioning lever 20 as shown in FIG. 2.

The tensioning lever 20 is likewise configured as a two-arm lever. The arms 37 and 37a of lever 20 have substantially the same length and are configured to approximate elongated rectangles. The arms 37 and 37a of tensioning lever 20 conjointly define a large obtuse angle. The tensioning lever 20 is pivotally mounted to the housing 16 of the chain saw to pivot about axis 38. A spiral spring 39 resiliently biases the tensioning lever 20 in the direction of arrow P as shown in FIG. 2. The spiral spring 39 is braced at one end 39a at the region of the pivot axis 38 on the first arm 37 and, at its other end 41, the spring 39 is secured to the housing 16. The free end 32 of the second arm 37a is, as the end 35 of the first arm 37, rounded to define a portion of a circle so that contact with the cam 19 is substantially only a line contact thereby minimizing wear. The end 35 of tensioning lever 20 has a lug-like latch 35a formed thereon having a center point M. The latch projects beyond the outer side 45a of the lever 20 facing toward the housing as shown in FIG. 2b.

The actuating member 8 is defined by a one-arm pivot lever. The Bowden cable 7 acts upon end 44 of actuating lever 8 when the release lever 6 (FIG. 1) is actuated. The actuating member can also be actuated by an electric, pneumatic or hydraulic device connected to an appropriate release device such as a sensor, switch or the like.

The actuating lever 8 is pivotally mounted on the housing 16 about axis 46 (FIG. 2a). The lever 8 is configured to have an arcuate bearing portion 47 at the side thereof facing away from the housing 16 at the location of the pivot axis 46. The arcuate bearing portion 47 engages the lug-like latch 35a of the tensioning lever 20. The arcuate bearing portion 47 is formed as a portion of a circle and is arcuately arranged about axis 46. The actuating lever 8 is eccentrically journalled so that the line of action of the abutting force F of the latch 35a at its contact location 50 with the arcuate bearing portion 47 defines a moment arm a with respect to the axis 46.

In the ready position of the braking arrangement 9 shown in FIG. 2, the brake spring 11 is tensioned via the brake lever 10 and the brake band 12 is lifted off of the brake drum 13. The braking arrangement of the invention includes a latching arrangement which is made up of the tensioning lever 20, the intermediate lever 21, and the actuating lever 8. The brake lever 10 is held in the ready position by the latching arrangement in that the intermediate lever 21 connected to the brake lever 10 is pressed with tensioning lever 20 past an extended position as shown in FIG. 2. The tensioning lever 20 and intermediate lever 21 are held in this position by the actuating lever 8. Further, the axis 29 of the intermediate lever 21 and the axis 38 of the tensioning lever 20 are on a straight line G which is spaced a small distance to the right of a center point M of the joint connection 48, the center point M being conjointly defined by the lug-like latch 35a and the notch 31.

The force of the brake spring 11 imparts a force to joint connection 48 in this position which is directed to the left. This force directed to the left tends to rotate the tensioning lever 20 in a direction opposite to that indicated by arrow P. The actuating lever 8 prevents joint connection 48 from permitting this to happen and the lug-like latch 35a of the tensioning lever arm 37 is supported laterally on the arcuate bearing portion 47 of actuating lever 8. In this way, the point connection 48 is fixed in position.

The actuating lever 8 is so configured that it tends to rotate under the force of tensioning lever 20 in order to release the lever 20. The joint connection 48 imparts an opening moment to arcuate bearing portion 47 via the lug 35a. It is noted that the axis 46 of the arcuate bearing portion 47 lies beneath its contact location 50 with the lug-like latch 35a (FIG. 2a) whereby a moment is formed which tends to cause the actuating lever 8 to rotate into the release position shown in FIG. 3. It is essential only that the releasing force of the releasing device acts on the arcuate bearing portion 47 of the actuating lever 8 and that this force should be held as small as possible.

The pivotal movement of the actuating lever 8 is prevented by a counterforce acting on the release device or release lever 6 (FIG. 1). This counterforce is generated by the hand (not illustrated) of the operator of the chain saw 1 which grasps the throttle lever 5. When the operator withdraws the hand from the rear handle 4, for example, when falling, the counterforce is removed by a relaxation of the Bowden cable 7 and the actuating lever 8 is pivoted by the opening moment which acts thereupon.

Figure 3:
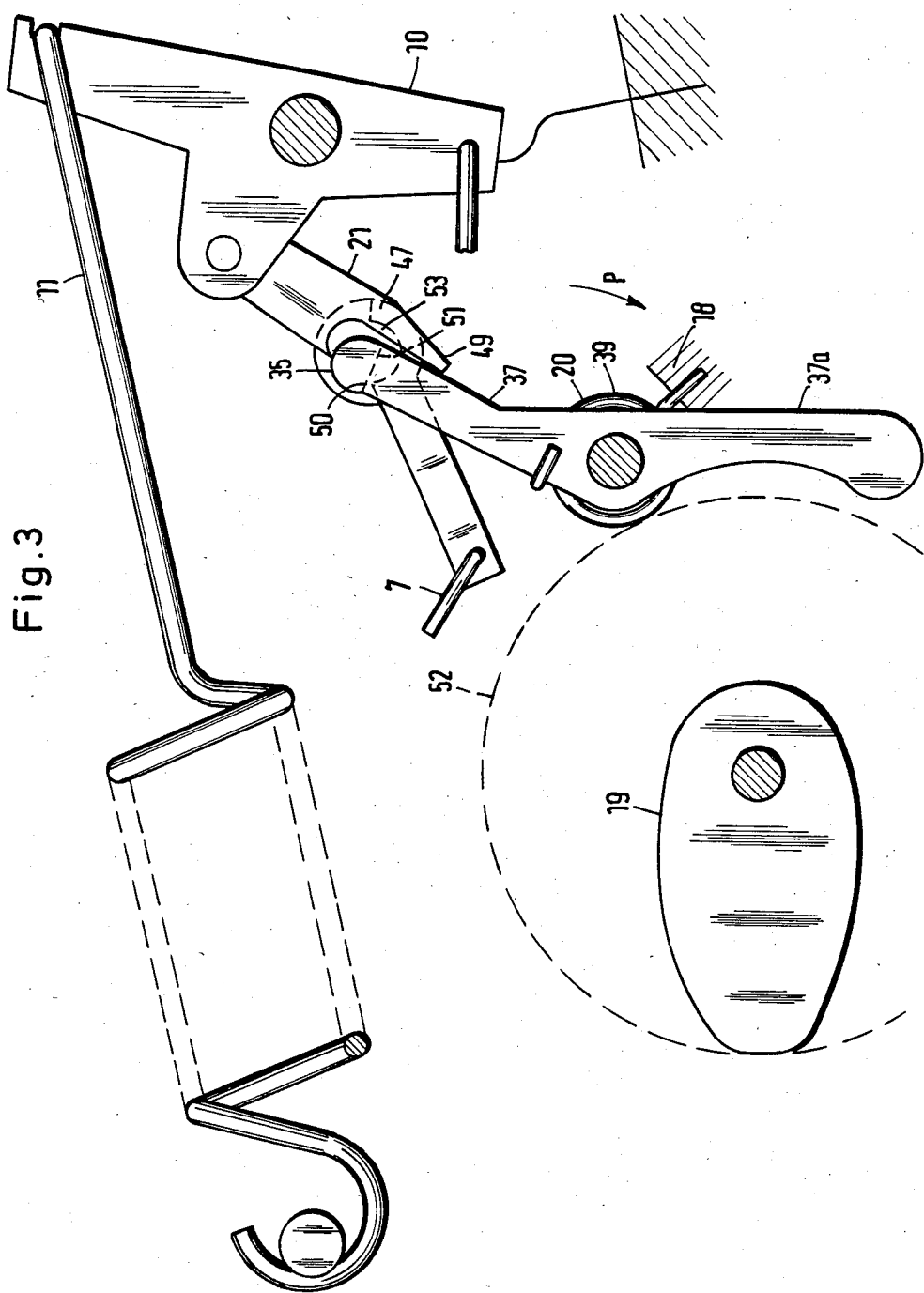
FIG. 3 is a schematic of the braking arrangement of FIG. 2 in an intermediate position wherein the release device has been actuated.

When the actuating lever 8 pivots downwardly, the arcuate bearing portion 47 likewise rotates so that its contact location 50 with the latch 35a of the tensioning lever 20 moves downwardly until it is below the lower edge 51 of the lug-like latch 35a and thereby releases the tensioning lever 20 (FIG. 3). At the same time, the tensioning lever 20 moves under the force of the intermediate lever 21 in a direction opposite to that of arrow P, that is, to the left and against the direction of the spring force which acts upon lever 20.

In this position, the joint connection 48 defined in the ready position of the braking arrangement 9 between the tensioning lever 20 and the intermediate lever 21 can no longer transmit a holding force to the braking lever 10 so that the intermediate lever 21 is lifted out of the joint connection 48 via a bearing edge 49 of the finger-like projection 34 (FIG. 3) in that this edge braces on the longitudinal edge 36 of the tension lever arm 37.

The finger-like projection 34 in this way effects a rapid opening of the joint connection 48 after release of the actuating lever 8 when the braking action is initiated. Since the braking lever 10 can no longer be held in its ready position by the latch device (8, 20, 21) against the force of the brake spring 11, the brake lever 10 is pivotally rotated to the braking position shown in FIG. 4 by the force of the brake spring 11. At the same time, the brake band 12 is pulled to the right until it seats tightly about the brake drum 13 thereby immediately braking the latter. With the brake drum 13, the movement of the saw chain (not illustrated) is interrupted so that the danger of injury is prevented which could occur through contact with the moving saw chain or through a stumbling into the saw chain.

Figure 4:
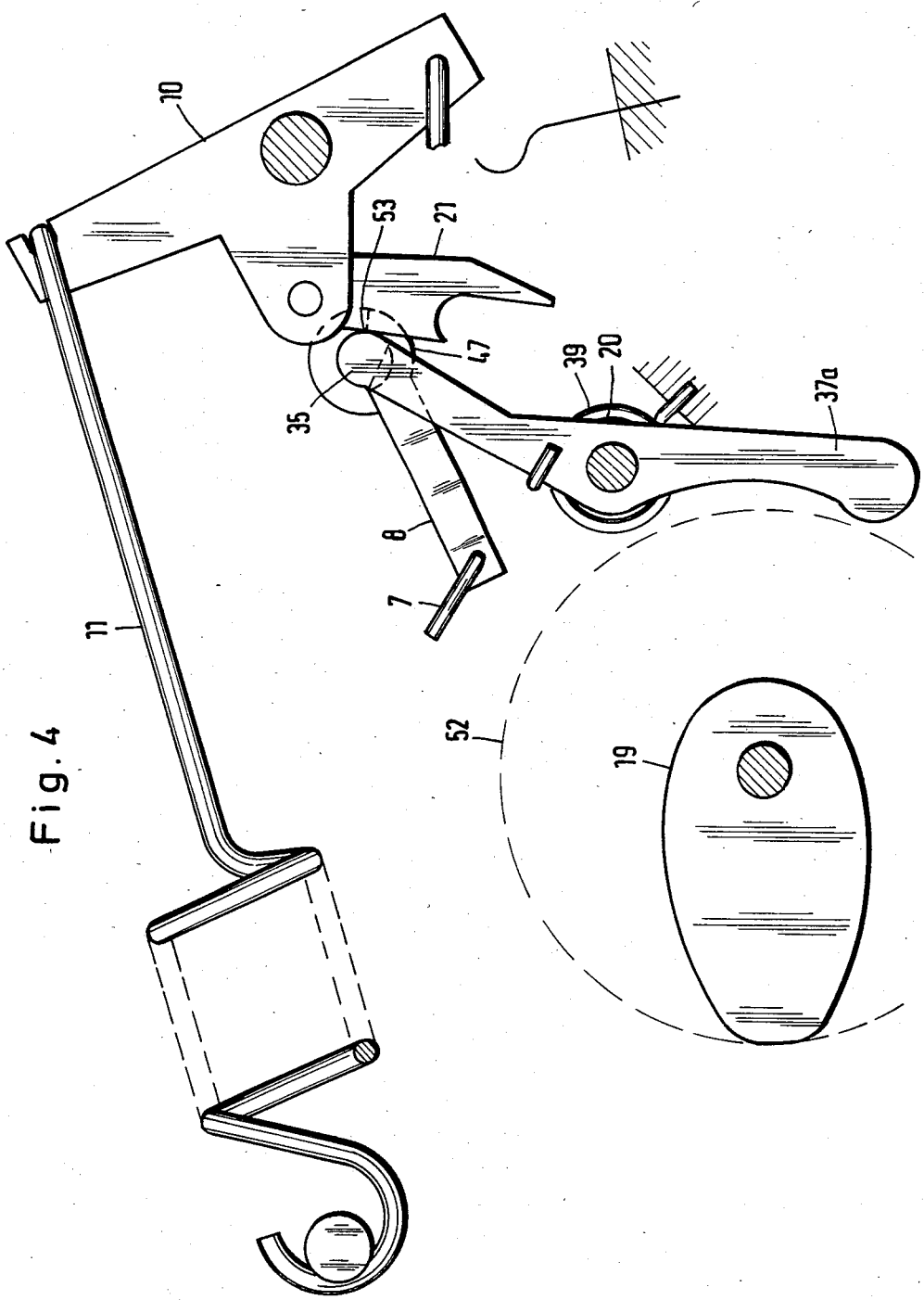
FIG. 4 is a schematic of the arrangement of FIG. 2 wherein the brake has been applied and wherein the tensioning lever is shown in a latched position outside of the path of a cam of the arrangement.

The tensioning lever 20 tries to enter the path 52 of the cam 19 under the force of the spiral spring 39 in that the spiral spring urges the lever to rotate in the direction P about its axis 38. However, this pivotal movement is limited because the tensioning lever 20 comes to rest against a second contact location 53 on the arcuate bearing portion 47 of the actuating lever 8 (FIG. 4). The contact locations 50 and 53 of the arcuate bearing portion 47 are mutually adjacent and each define abutment surfaces for the lug-like latch 35a thereby preventing the joint connection 48 from opening so that the tensioning lever 20 is prevented from jumping into the path 52 of the cam 19.

In the abutment or latching position shown in FIG. 4, the tensioning lever 20 is held outside of the path 52 of the cam 19 with its second arm 37a so that the braking arrangement 9 cannot unintentionally be brought into the ready position. The chain saw 1 is therefore effectively braked whereby the motor runs with a rotational speed less than the slip speed of the coupling.

Figure 5:
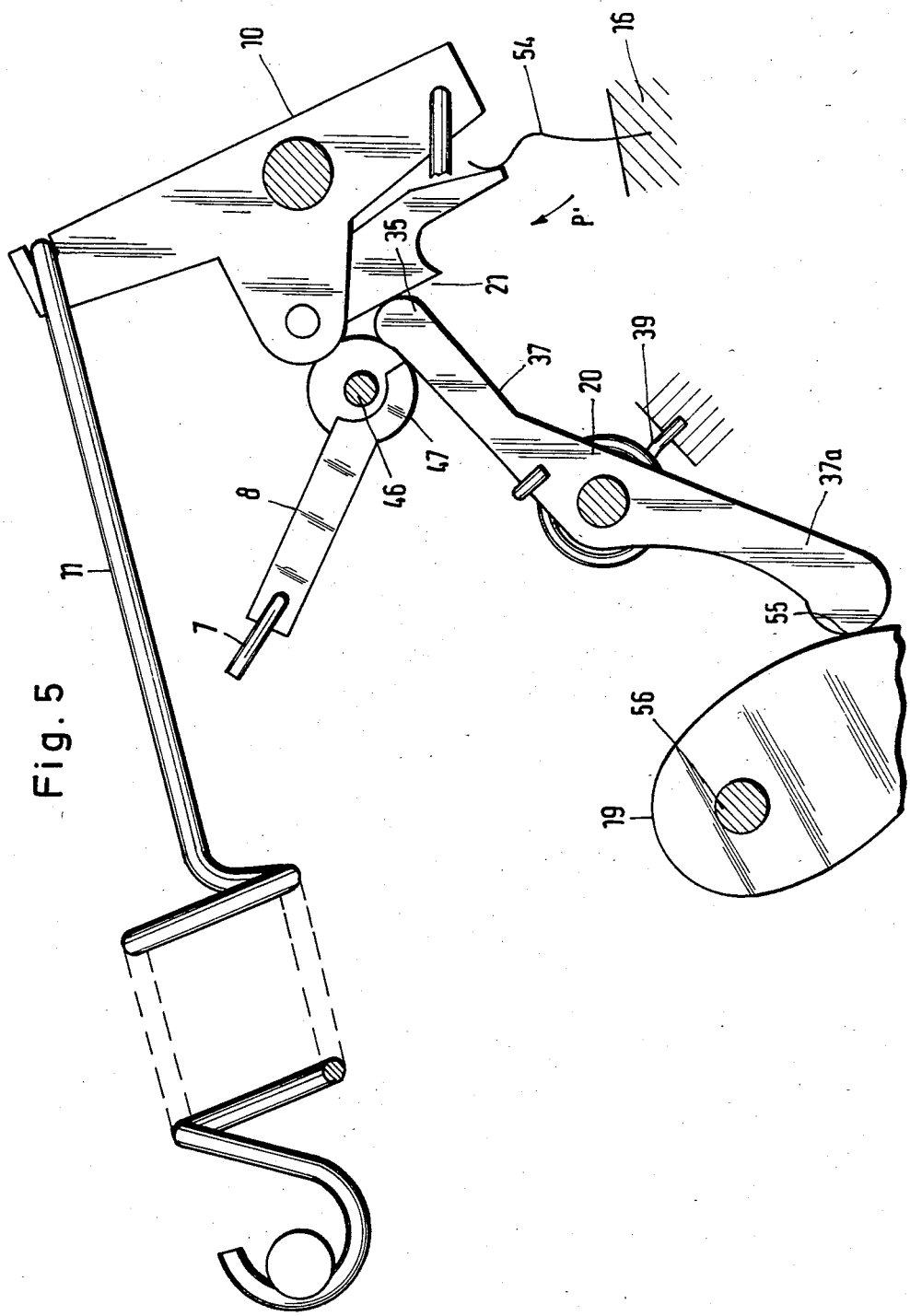
FIG. 5 shows the braking arrangement of FIG. 4 wherein the tensioning lever is in its freed position wherein the lower portion thereof projects into the path of the cam.

In order to lift the brake band 12 from the brake drum 13, the latch between the actuating lever 8 and the tensioning lever 20 must first be released because only then can the tensioning lever 20 jump into the path 52 of the cam 19 under its own spring force. For this purpose, the release lever 6 is depressed by grasping the rear handle 4 whereby the actuating lever 8 is caused to pivot upwardly about its pivot axis 46 (FIG. 5). At the same time, the second contact location 53 of the arcuate bearing portion 47 moves in the clockwise direction so far that the lug-like latch 35a can move over the arcuate bearing portion 47 under the force of the spiral spring 39 of the tensioning lever 20 and, with its second arm 37a, can rotate to a desired position in the path 52 of the cam 19. The tensioning lever 20 then follows the cam 19.

Figure 6:
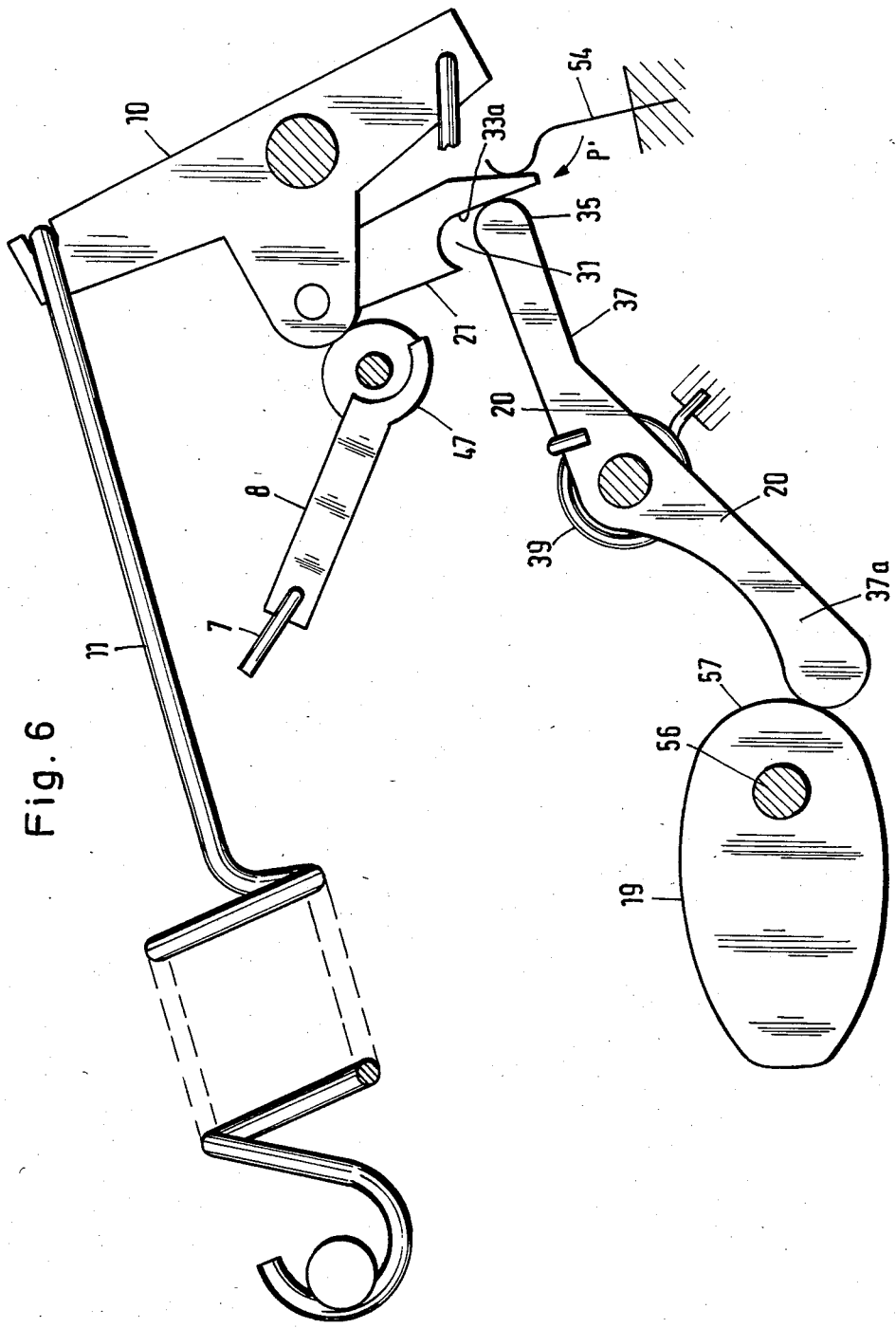
FIG. 6 is a schematic of the braking arrangement of FIG. 5 before the cam engages the tensioning lever and moves it along against the spring force for return to the ready position.

Reference numeral 55 identifies the contact surface between the cam 19 and the arm 37a. As the spacing between contact surface 55 and the cam axis 56 becomes less, the tensioning lever 20 moves with its first arm 37 toward the right and presses simultaneously on the intermediate lever 21 with its end 35 so that the latter is pivoted toward the right (FIG. 5) and, preferably, comes to rest with its finger-like projection 34 on a spring 54 fixedly mounted to the housing. In this way, the intermediate lever 21 will be loaded under the force of the pressure spring 54 in the direction of the arrow P'. The tensioning lever 20 snaps with its end 35 into the notch 31 of the intermediate lever 21 (FIG. 7) shortly before reaching the cam surface segment 57 (FIG. 6). The cam surface segment 57 is at the smallest spacing of the contact surface 55 from the cam axis 56. By means of the cam 19, the tension lever 20 is pivoted toward the left against the direction of the arrow P and comes to rest with its upper end 35 on the outer side 33a of the intermediate lever 21. Therefore, both levers define the common joint connection 48 with a further rotation of the cam 19. The joint connection 48 can only transmit forces in a predetermined direction, namely, in the direction toward the axis 22 of the brake lever 10.

Figure 8:
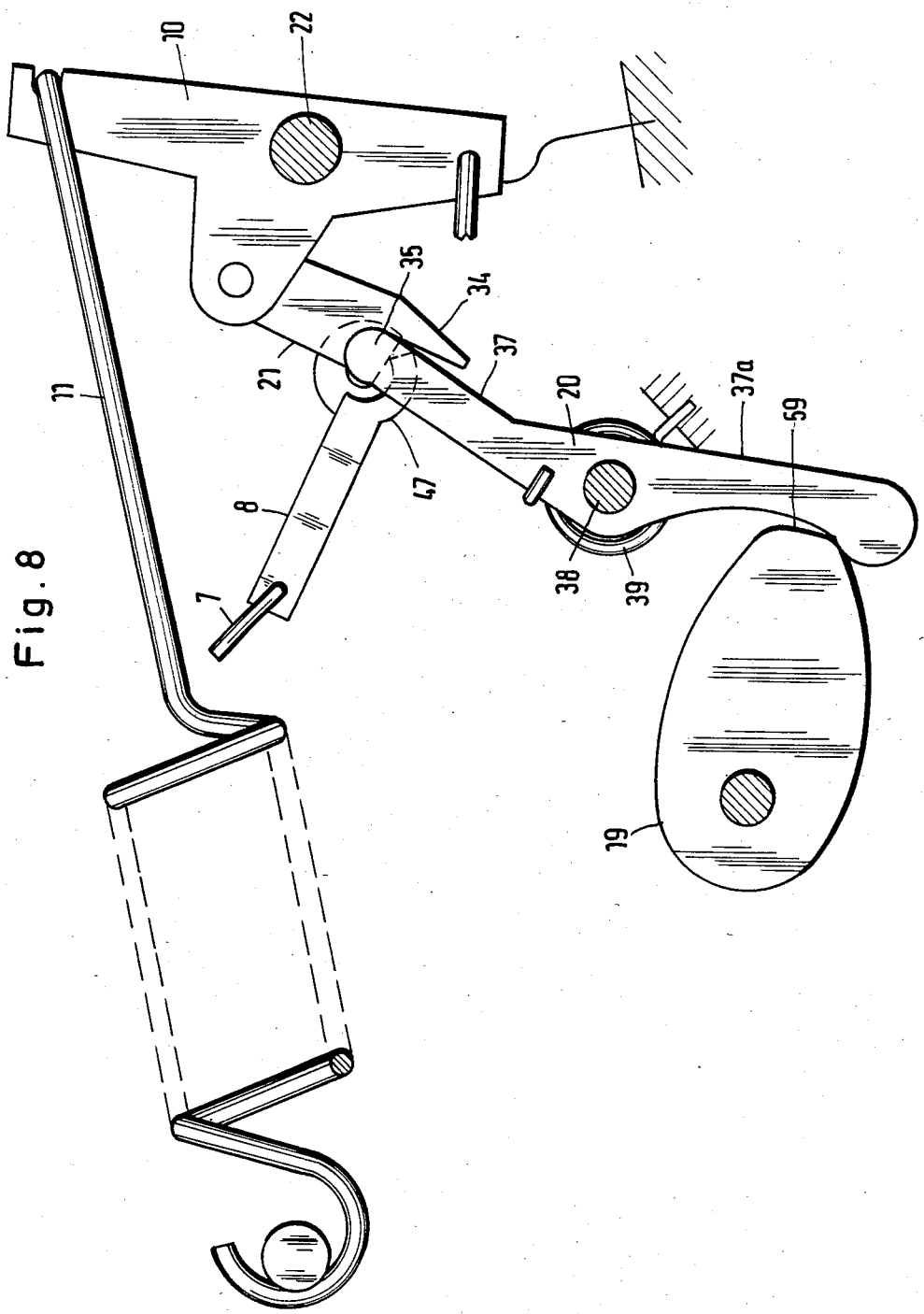
FIG. 8 is a schematic of the braking arrangement of FIG. 7 wherein the tensioning lever and the brake lever are in an extended position just before transfer to the ready position shown in FIG. 2.

With a further rotation of the cam 19, the braking lever 10 is lifted and the brake spring 11 is tensioned. The cam surface 55 of cam 19, which contact engages tensioning lever 20, has a curvature selected to ensure that the torque applied at the cam surface 55 to the tensioning lever 20 to retension the latter and return it to the rest position remains constant. The levers 10, 20, 21 conjointly define a joint whereby the tensioning lever 20 and the intermediate lever 21 take on the extended position shortly before the second arm 37a comes to rest on the apex 59 (FIG. 8) of the cam 19. By reaching the apex 59 which is the greatest distance of the contact surface 55 from the axis 56, the intermediate lever 21 is pressed over the extended position. When this extended position is overcome, the force applied to the tensioning lever 20 is also changed in direction so that the tensioning lever 20 by itself is pressed out of the path 52 (FIG. 2) and is limited with respect to its further movement by the actuating lever 8. In order to prevent an uncontrolled rubbing between the cam 19 and the tensioning lever 20, a slide or roller bearing can be arranged either on the end 32 of the tensioning lever 20 or on the cam in the region of its apex 59.

Since only the release lever 6 or the actuating lever 8 must be actuated in order to lift the brake band, this lifting requires no high force and can be done simply and quickly. Since both hands can remain on the handles 2 and 4 of the chain saw 1, the chain saw is immediately in condition for use. Furthermore, the desired two-hand safety condition can be obtained if a release device is also provided on the front handle 2.

The braking arrangement 9 affords the advantage that even numerous false releases of the braking arrangement during operation do not lead to an unacceptable burdening of the operator since the braking arrangement can be placed in the ready position quickly and with little effort by simply actuating the release device again.

The braking arrangement of the invention described in the foregoing can above all be released simply and quickly since the joint connection 48 can be tightly held by the actuating lever 8 shortly after the extended position (FIG. 2) is reached. Accordingly, the joint connection 48 is only slightly deflected so that small supporting forces and therefore small actuating forces are effective.

Because of the fast and simple actuation of the braking arrangement 9, the precondition is achieved to evaluate many different danger signals in addition to providing a kickback braking action. For example, the throttle lever 5 and/or the hand-guard lever 18 can be connected with the actuating lever 8.

In every situation, only a connection between the actuating lever 8 and a danger signal serving as a release device has to be established whereby the release device can be in the form of the hand-guard lever, the throttle lever or another device which can provide a signal. This release device is preferably arranged in the region of the rear handle. In addition, such a signal generating means can be a two-hand safety arrangement at the front handle. The brake band 12 can then be lifted quickly and simply at anytime by actuating the applicable releasing member. By means of the further danger signals, injuries by the top run of the saw chain or from stumbling onto the running saw chain, as well as injuries by not actuating the brake when starting the motor and the like, can be substantially reduced. Finally, the braking arrangement 9 is very light since it is made up only of a few simple individual pieces such as the brake lever, intermediate lever, tensioning lever and actuating lever.

Figure 9:
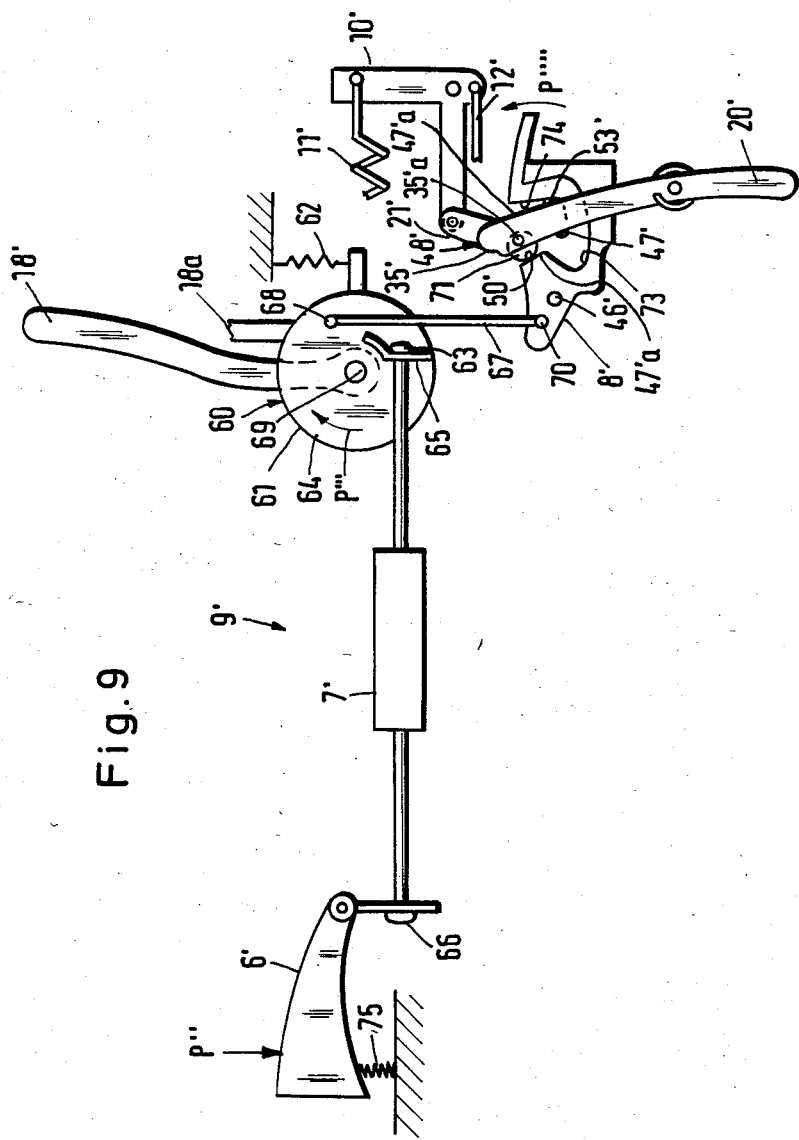
FIG. 9 is a side elevation view, in schematic representation, of a second embodiment of a braking arrangement according to the invention in its ready condition.

If the hand-guard lever is connected with the actuating lever for releasing the braking arrangement, the release of the braking arrangement will be self-acting when the hand-guard lever is thrown back so that an automatic kickback braking arrangement is provided (FIG. 9).

Referring now to the embodiment of the invention shown in FIG. 9, the braking arrangement 9' includes a hand-guard lever 18' which acts upon a switching unit 60 via a follower 18a. The switching unit 60 is made up essentially of a disk 61 rotatably mounted on the housing to rotate about an axis 69. The disk 61 is biased in a counterclockwise direction by a tension spring 62 fixedly attached to the housing. A Bowden control cable 7' is connected to the disk 61 and its one end 63 is arranged so as to be freely movable in a guide opening of an abutment 65 mounted on the disk. The abutment 65 projects perpendicularly above the outer surface 64 of the disk 61 and is, for example, in the form of a strut. The end 63 of the control cable 7' has a rivet-like head formed thereon by means of which the control cable 7' abuts against the abutment 65 when a release lever 6' secured to the other end 66 of the control cable 7' is released. The release lever 6' is pivotally mounted in the manner described for the embodiment according to FIGS. 1 to 8, that is, the lever 6' is pivotally mounted in the rear handle of the chain saw and biased by spring 75 in a direction opposed to the pressing force P'''.

The actuating lever 8' also acts upon the disk 60 via a rod 67. The rod 67 is pivotally mounted to the disk 60 with its end 68 above and with a lateral spacing to the right of the rotational axis 69 of the disk 60. The other end 70 of the rod 67 is pivotally connected with the actuating lever 8' which is pivotally mounted to the housing for rotation about axis 46'.

In the ready position shown, the upper end 35' of the tensioning lever 20' lies against the first contact location 50' of the opening 47' formed in the actuating lever 8'. The tensioning lever 20' lies against the contact location 50' with the roller 71 mounted on the lug-like latch 35'a of the lever 20'. The contact location 50' is defined by an upper segment of edge 47'a of the opening 47'. The upper segment of edge 47'a is curved about the pivot axis 46' of the lever 8'. Configured in this way, the roler 71 lies against the contact location 50' with a line contact and with limited surface pressure. Because of the minimal rolling friction of the roller 71 on the actuating lever 8', the lever 8' can be moved simply and quickly into the braking position with a minimum of force.

If the hand-guard lever 18' is released because of a kickback of the chain saw, then the disk 61 rotates via the follower 18a against the force of spring 62 in the clockwise direction (arrow P'''). This movement is possible even when the lever 6' is pressed because of the free movement of the rivet-like head end portion of the Bowden control cable with respect to abutment 65. As a consequence of this movement, the rod 67 moves downwardly whereby the actuating lever 8' pivotally rotates upwardly about its pivot axis 46' in the direction of arrow P''''. The roller 71 then glides along the edge 47'a of opening 47 downwardly to the base 73 of the opening 47'. At the same time, the joint connection 48' is released and the roller 71 is held at the second contact location 53' of the opening 47' so that the tensioning lever 20' cannot jump into the path of the cam. This contact location 53' is arcuately formed about the pivot axis 46' in the same manner as the first contact location 50'.

Figure 7:
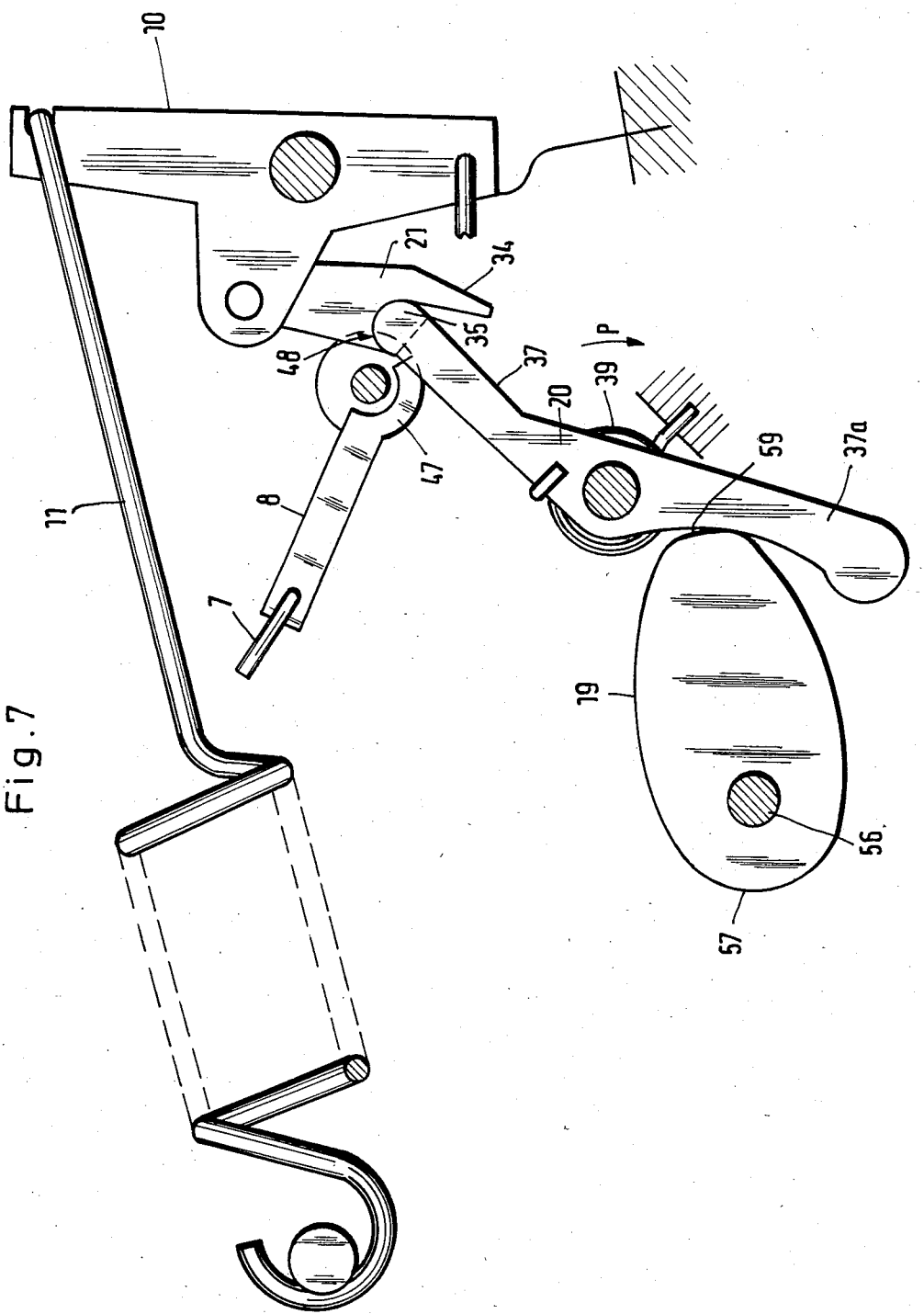
FIG. 7 is a schematic of the braking arrangement of FIG. 6 wherein the tensioning lever and the braking lever conjointly define a joint connection.

To release the brake band, the hand-guard lever 18' is first brought into its ready position and then the release lever 6' is pivoted out of the unpivoted position into the pressed position whereby the disk 60' is rotated back under the force of the tension spring 62 in a counterclockwise direction. In this way, the actuating lever 8' is pivotally rotated downwardly in the clockwise direction via rod 67. At the same time, the tensioning lever 20' with its roller 71 moves upwardly over the second contact location 53'. As a consequence, the tensioning lever 20' changes the location on the actuating lever 8' against which it rests in that it glides with its lug-like latch 35a along the edge 74 of the opening. The opening edge 74 is displaced with respect to the second contact location 53' in the direction toward the housing. In this way, a back and forth movement of the tensioning lever 20' is prevented when the latter jumps into the path of the cam since the switching occurs along the shortest path. The tensioning lever 20' jumps into the path of the cam as already described. Then the tensioning lever 20' is so pivoted under the force of the cam surface of the cam means applied thereto that it comes into engagement with the intermediate member 21' as shown in FIGS. 6 and 7. Thereafter, lever 20' moves toward the left until past the dead center position and reaches the ready position shown wherein it is held tightly by the actuating lever.

The braking arrangement 9' can also be released when the release lever 6' is let go by the operator during operation. In this instance, the disk 60 is rotated in the clockwise direction (arrow P''') via the action of pressure spring 75 acting on lever 6' and via control cable 7' and its rivet-like head 63 acting on the abutment 65. At the same time, the actuating lever 8' is rotated upwardly in the direction of arrow P''''. In this way, the tensioning lever 20' with its roller 71 moves into the opening 47' so that the joint connection 48 opens and the brake lever 10' pivots under the force of the brake spring 11' in such a manner that the brake band 12' comes to rest on the brake drum. To release the brake band, the lever 6' must again be depressed as previously described.

Figure 10:
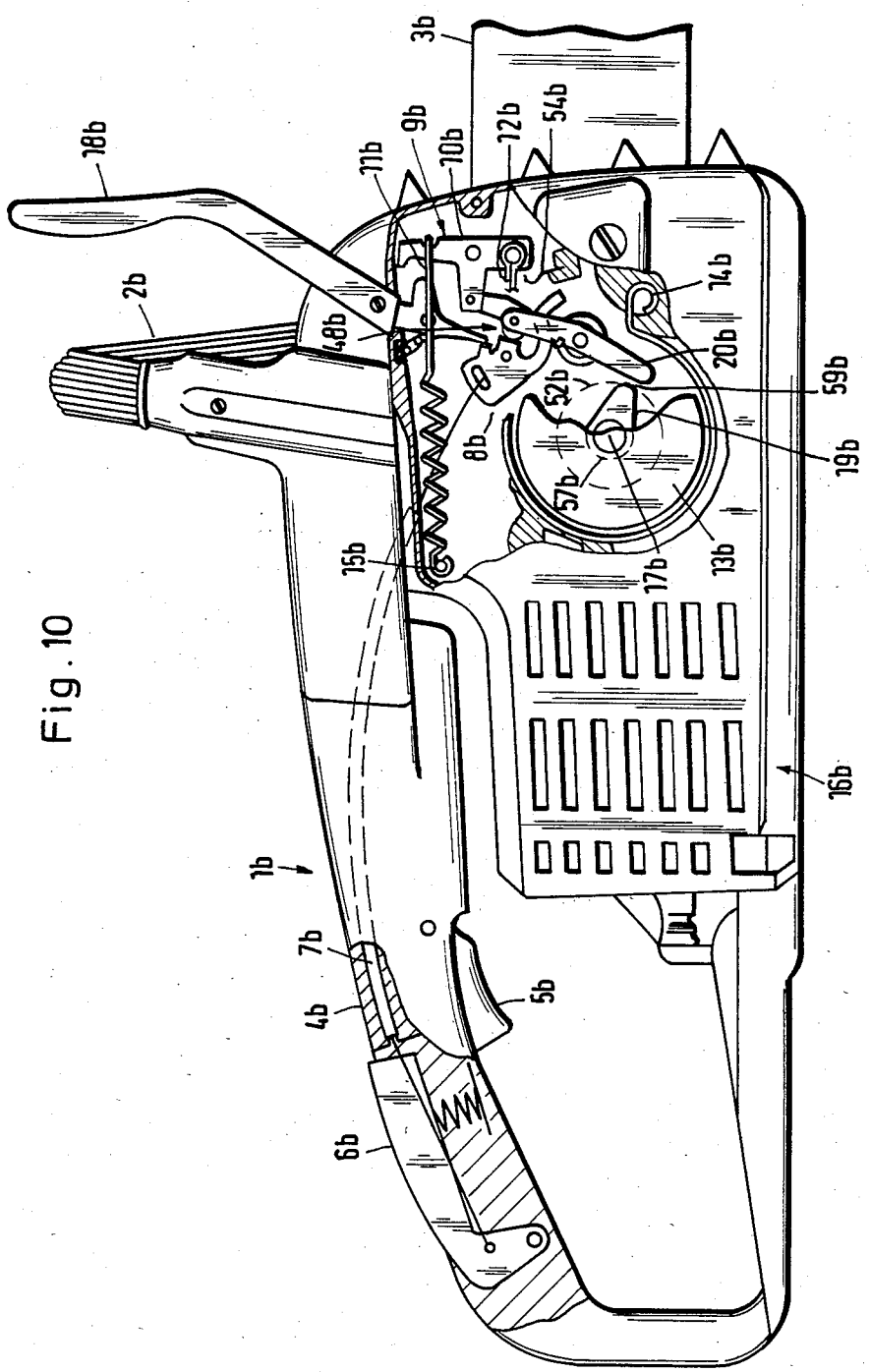
FIG. 10 is a side elevation view of a chain saw wherein the housing wall has been partially broken away to expose an embodiment of the braking arrangement according to the invention in the ready condition and wherein a release device is actuated.

A further embodiment of the invention is illustrated in FIGS. 10 to 12 wherein the chain saw is identified by reference numeral 1b and the braking arrangement by reference numeral 9b. The parts described previously for the chain saw are here identified with the same reference numerals; however, the index "b" is now associated with each such reference numeral. The braking arrangement 9b differs from the embodiment of FIG. 9 only in a different configuration of the actuating lever 8b and of the release lever or hand-guard lever 18b.

The actuating lever 8b is configured as a two-arm, plate-like pivot lever which pivots about axis 46b on the housing 16b. The two arms of lever 8b are identified by reference numerals 51b and 51b'. The Bowden control cable 7b acts upon the free end of the lever arm 51b of the actuating lever 8b. The Bowden control cable 7b is hooked with its one end 58b into a guide slot 43b of the lever arm 51b. The guide slot 43b is formed as a segment of the circumference of a circle about the pivot axis 46b.

The other lever arm 51b' of the actuating lever 8b includes an opening 47b having first and second wall edge segments 47b' and 47b''. The second edge segment 47b'' is curved about a center point M which lies at a distance l from the pivot axis 46b. At its free end 51b''', the lever arm 51b' is bent outwardly to define an approximate right angle.

A projection 100b at about the elevation of pivot axis 46b is provided between opening 47b and an approximately V-shaped recess 40b (FIGS. 11 and 12). The lower edge of the projection 100b defines the first edge segment 47b' and the end face 50b of projection 100b defines a first contact location for end 35b of the tensioning lever 20b. The end face 50b is likewise arcuately formed about the pivot axis 46b of the actuating lever 8b. The tensioning lever 20b lies against this first contact location 50b with a roller 71b when the hand-guard lever 18b is in the tensioned ready position shown in FIGS. 10 and 11. The roller 71b is mounted on a lug-like projection of end 35b of lever 20b. The hand-guard lever 18b constitutes a first release device for the chain brake arrangement 9b.

The edge portion of the recess 40b closest to the guide slot 43b includes an abutment cover plate 42b which preferably projects outwardly therefrom in the perpendicular direction. The hand-guard lever 18b lies against the abutment plate 42b in the ready position with its take-along arm 67b.

The take-along arm 67b is a first arm of an approximately star-shaped, three-armed end portion 18b' of the hand-guard lever 18b. The take-along arm 67b is longer than both of the other arms 101b and 102b of the take-along end portion 18b' and tapers down in width in the direction of the free end 67b' which is narrower than the opening 40b.

The second arm 101b of end portion 18b' of hand-guard lever 18b is pivotally connected with a further linkage arm 103b to define a knee joint. The linkage arm 103b is pivotally mounted on the housing 16b. With the knee linkage 101b, 103b, the hand-guard lever 18b is resiliently biased in its ready position (FIGS. 10 and 11) as well as in its released position (FIG. 12) by means of a compression spring 62b because the linkage point G lies, in both positions, to the left and right, respectively, next to the force direction line W of the spring 62b acting upon linkage arm 103b.

The third arm 102b of the hand-guard lever 18b' is, like the other arms, configured to taper and narrow outwardly from the pivot axis 69b of the lever 18b'. The arm 102b serves as a take-along arm for the brake lever 10b on which it comes to rest when the hand-guard lever 18b is pivotally returned over and beyond the ready position (FIG. 11) in the direction of arrow P' from its release position shown in FIG. 12. This causes the brake lever 10b to be pivoted very slightly in the clockwise direction whereby the brake band 12b is lifted from the brake drum 13b as shown in FIG. 10. This function is also possible if the brake is released via the release lever 6b; however, the hand-guard lever 18b then remains in its ready position. In this lifted position of the brake and 12b, the saw chain (not shown) and the sprocket wheel (likewise not shown) of the chain saw 1b can be simply and quickly retensioned and exchanged. This work is accomplished with the chain saw at rest and the brake in the released position.

If the hand-guard lever 18b is released with a kickback of the chain saw, it pivots against the force of the spring 62b in the clockwise direction (arrow P″ in FIG. 11). This movement is transmitted to the actuating lever 8b via the take-along arm 67b when the take-along arm 67b comes into engagement contact with the abutment plate 42b thereby causing the actuating lever 8b to be pivotally rotated about its pivot axis 46b in the counterclockwise direction. This pivotal movement of the actuating lever 8b is made possible by the free movement permitted the end 58b of the Bowden control cable in the guide slot 43b. In the released position of the hand-guard lever 18b, the end 58b of the Bowden control cable lies at the rearward end of the guide slot 43b when viewed with respect to the pivot direction of the actuating lever 8b; whereas, the end 67b' of the take-along arm 67b lies in the recess 40b (FIG. 12).

When the actuating lever 8b is pivoted, the roller 71b of the tensioning lever 20b glides along the first edge segment 47b' downwardly to the second edge segment 47b″ of the opening 47b. This causes the joint connection 48b (FIG. 12) to open which then no longer is braced at the actuating lever 8b that is, at its projection 100b so that the opening moment caused by the joint connection, which is over-tensioned toward the left, becomes effective. At the same time, the roller 71b is held fast in the opening 47b so that the tensioning lever 20b cannot jump into the path 52b (FIG. 10) of the cam 19b.

Because tensioning lever 20b is loaded in the direction of the arrow P (FIG. 12) by the torsion spring (not shown) which acts thereupon and because the center of curvature point M of the second wall segment 47b″ is located at a spacing from the pivot axis 46b of the actuating lever 8b, a rotation moment acts upon the actuating lever 8b in the clockwise direction. If the release lever 6b is in the depressed position when the chain brake arrangement 9b is released, the actuating lever 8b could rotate in the clockwise direction shown in FIG. 11 because of the free movement permitted the Bowden control cable 58b in its guide slot 43b, if it were not for the take-along arm end portion 67b'. If, in contrast, the release lever 6b is released, the rotation of the actuating lever 8b is prevented because the Bowden control cable 7b which, with its free end 58b, lies against a corresponding end of the guide slot 43b. Therefore, in order to lift the brake, the release member 6b must be depressed whereby the Bowden control cable end 58b glides upwardly in its guide slot 43b so that a free space becomes available beneath the end 43b of the control cable 7b which makes possible the pivot movement of the actuating lever 8b under the force of the tension lever 20b.

It is only possible to return the actuating member 8b to its initial position if the hand-guard lever 18b is first manually pivoted to its ready position (FIG. 11) wherein it self-latches via the knee levers 101b, 103b.

When the actuating member 8b pivots from the release position to the ready position, the roller 71b of the tensioning lever 20b glides over the second wall segment 47b″ to the angled end 51b' of the arm 51b of the actuating member 8b. The tensioning lever 20b can now rotate in the clockwise direction under the force of the rotation spring acting thereon. With this action, the free end 32b of arm 37b' jumps into the path 52b of the cam 19b. Now the tensioning lever 20b contact engages the cam 19b so that it follows the latter. With decreasing distance of the contact surface between the cam 19b and the tensioning lever arm 37b' from the axis 56b of the cam, the tensioning lever 20b moves with its arm 37b in the clockwise direction and presses with its end 35b against the intermediate lever 21b moving the latter to the side so that the intermediate lever 21b pivots in the counterclockwise direction and with its free end 34b comes into engaging contact with the spring 54b (FIG. 10) fixedly mounted to the housing.

With this action, the intermediate lever 21b is spring loaded in the direction of the tensioning lever 20b.

The tensioning lever 20b snaps with its end 35b into the latch opening 31b of the intermediate lever 21b (FIGS. 10 and 11) shortly before reaching cam portion 57b which is at the smallest spacing of the contact surface between lever 20b and cam 19b from the rotational axis 56 of the cam. With this action, the joint connection 48b is formed. The joint connection 48b can only transmit forces in a specific direction, namely, in a direction toward the axis 39b of the tensioning lever 20b.

With the further rotation of the cam 19b, the brake lever 10b is rotated about its axis 22b in the clockwise direction and tensions the brake spring 11b. The levers 10b, 20b, 21b conjointly define a joint in this tension position whereby the tensioning lever 20b with the intermediate lever 21b take on the extended position just shortly before the second tension lever arm 37b' comes into contact engagement with the apex 59b (FIG. 10) of the cam 19b. When the apex 59b is reached, the intermediate lever 21b is pushed to the left past the extended position (FIG. 11). By overcoming this extended position, the spring force acting upon the tensioning lever 20b is also changed in direction so that the tensioning lever pushes itself out of the path 52b of the cam 19b and is limited with respect to further movement by its contact engagement on the projection 100b of the actuating member 8b.

The chain brake arrangement 9b can also be released if the release lever 6b is released during operation. In this instance, the end 58b of the Bowden cable 7b is moved downwardly whereby the actuating member 8b is rotated in the counterclockwise direction. In this way, the tensioning lever 20b with its roller 71b moves into the opening 47b so that the joint connection 48b opens and so that the brake lever 10b is pivotally rotated under the force of the brake spring 11b acting thereupon such that the brake band 12b comes to rest on the brake drum 13b. In order to lift the brake band, the release lever 6b must be depressed again whereby the end 58b of the Bowden cable glides in the guide slot 43b upwardly and, at the same time, the actuating member 8b rotates in a clockwise direction into its ready position (FIG. 11) under the force of the tensioning lever 20b acting thereupon.

This arrangement is exceptionally simple to build and therefore can be manufactured with minimum cost. Furthermore, it is hardly subject to failure.

The embodiment according to FIGS. 13 to 16 differs from the embodiment discussed above in that the Bowden control cable 7c is hooked with its end 58c in a switching member 72c which coacts with the actuating lever 8c. The switching member 72c is preferably made of sheet metal and has a shape which approximates a sector of a circle. The knee linkages 101b, 103b with which the hand-guard lever 18b was latched in the ready position and in the braking position are also omitted. In lieu thereof, only a compression spring 105c mounted on housing 16c is provided which presses upon the second arm 101c so that the hand-guard lever 18c is held in its ready position (FIGS. 13, 15) and is resiliently biased in a direction toward this ready position and so that the lever 18c can be rotated with spring 105c by itself out of the braking position (FIG. 14) back into the ready position.

The actuating lever 8c differs from the actuating lever 8b of FIGS. 10 to 12 only in that no slot is provided and that the outer edge 74c of the lever arm 51c facing the Bowden control cable includes two steps 104c and 76c, respectively. The outer edge 74c is curved about the pivot axis 46c and the steps 104c and 76c are disposed in spaced relationship to each other along the periphery of the edge 74c of switching member 8c. The first step 104c is wider than the second step and is provided a second abutment plate 77c lying approximately at a right angle to the first abutment plate 42c arranged at the free end 67c'. This abutment plate 77c is defined by the free end of the positioning member 72c facing away from the Bowden control cable 7c.

In its ready position, the actuating member 8c lies with its first step 104c on the abutment plate 77c (FIG. 13). The second step 76c acts as a latch opening wherein the leaf spring 78c latches with its free end when the actuating member 8c is in the braking position (FIG. 15). The leaf spring is pretensioned in a direction toward the actuating member 8c. In this way, the actuating member 8c is prevented from being pivoted in the clockwise direction to the ready position under the force of the tensioning lever 20c. In this connection, it is noted that the tensioning lever 20c presses with its roller 71c on the arm 51c' of the actuating member 8c (FIG. 15).

The second abutment plate 77c has the function to take actuating member 8c along into its released position if the release lever 6c is released and to unlatch the leaf spring 78c. For this purpose, the abutment plate 77c is configured to be so long that it projects outwardly beyond the step 104c corresponding thereto. The spacing between the steps 104c and 76c is so selected that the abutment plate 77c with its edge 79c projecting beyond the step 104c (FIGS. 14, 16) presses against the leaf spring 78c and prevents the latter to latch into the second step 76c when the switching unit 72c is pivotally rotated in the counter-clockwise direction and takes along the actuating member 8c in the same direction when the release lever 6c (FIG. 16) is released.

When the hand-guard lever 18c releases, it is pivotally rotated in the direction of arrow P (FIG. 13) and comes to rest on the first abutment plate 42c with the free end 67c' of its take-along arm 67c and, with further rotation, takes the actuating member 8c along into the braking position shown in FIG. 14. With this action, the leaf spring 78c glides along the edge segment 80c (FIG. 13) furthest away from the control cable 7c and then over and beyond the second step 76c until it comes to rest on the appropriate edge segment 81c behind the second step 76c viewed in rotational direction (FIG. 14).

As described with reference to FIGS. 10 to 12, the tensioning lever 20c. However, this rotational movement lever 21c and glides with its roller 71c into the recess 47c. The hand-guard lever 18c pivots by itself under the force of spring 105c acting upon its arm 101c back into the ready position. With this action, the take-along arm 67c disengages from the abutment plate 42c. The actuating member 8c is rotated in the clockwise direction under the force of the tensioning lever 20c. However, this rotational movement continues only so far until the free end of the leaf spring 78c comes into contact engagement with the second step 76c of the actuating member 8c as shown in FIG. 15. The abutment plate 77c lies in spaced relationship to step 104c in this latched position since the switching member 72c is not rotated therewith during the release action by hand-guard lever 18c.

The actuating member 8c can only be returned to its ready position from the latched position by actuating the release lever 6c. For this purpose, the release lever 6c must first be released (FIG. 16) whereby the switching unit 72c glides along the edge segment 74c in the counterclockwise direction and presses the leaf spring 78c out of the step 76c with its edge 79c of its abutment plate 77c.

Figure 16:
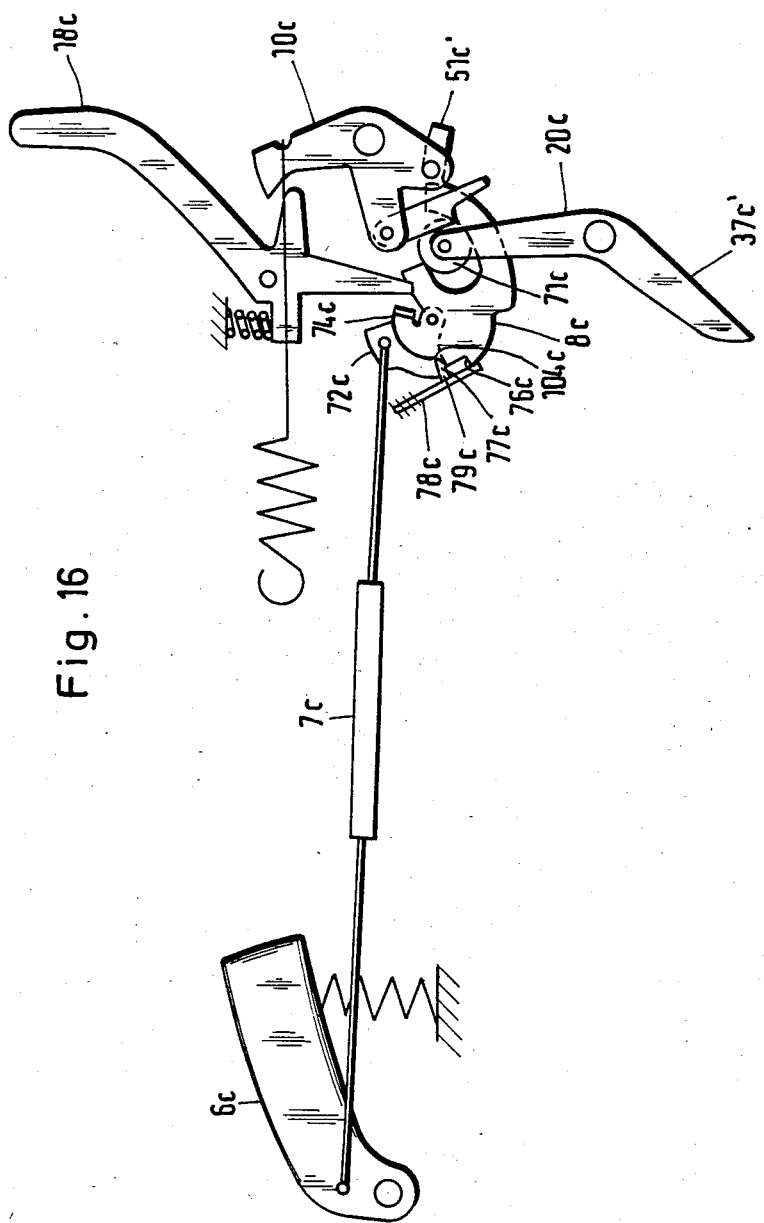
FIG. 16 is a schematic representation of the braking arrangement of FIG. 15 in the braking condition after a completed release by means of a release member wherein an actuating lever is latched by a position lever connected to the release member.

The actuating member 8c can then rotate in the clockwise direction under the force of the tensioning lever 20c so far until it comes to rest against the first step 104c on the abutment plate 77c of the positioning unit 72c (FIG. 16). In this position, the free end of the leaf spring 78c lies on the edge segment 80c of the actuating member 8c. In order to bring the actuating member 8c out of this position into the ready position, the release lever 6c must again be depressed whereby the switching unit 72c pivots via the Bowden control cable 72c in the clockwise direction into the position shown in FIG. 13 thereby releasing the actuating member 8c. The actuating member 8c can again be rotated in the clockwise direction under the force of the tensioning lever 20c until it reaches the ready position whereat it abuts against the abutment plate 77c (FIG. 13).

As in the previous embodiment, with this rotation of the actuating member 8c, the roller 71c of the tensioning lever 20c travels up to the region of the angled end 51c' (FIG. 16) of the actuating member 8c so that the tensioning lever arm 37c' jumps into the path of the cam thereby reestablishing the joint connection 48c (FIG. 13) and wherein the brake lever 10c is again placed under tension.

This embodiment has the advantage that the handguard lever 18c no longer has to be reset manually; the reset action is automatic via the spring 105c which very considerably facilitates the operation of the chain saw.

With the embodiment of the invention according to FIGS. 13 to 16, the chain brake arrangement can also be released through actuation of the release lever 6c. If the release lever 6c is released, it pivots under the force of the spring in a counterclockwise direction whereby the actuating member 8c is rotated in the counterclockwise direction by switching unit 72c via the abutment connection between the abutment plate 77c and the step 104c. This causes the tensioning lever 20c to pivot with its roller 71c in the opening 47c of the actuating member 8c so that the joint connection 48c is released and the braking lever 10c is pivoted into the braking position under the force of the brake spring 11c. The brake band 12c is thereby caused to come into engagement and lie upon the brake drum 13c (FIG. 10).

As described earlier, to lift the brake, the release lever 6c must be depressed. With this embodiment, the handguard lever can be rigidly mounted if another inertial mass is provided for releasing the brake and with which the actuating member 8c coacts in the manner described.

Figure 17:
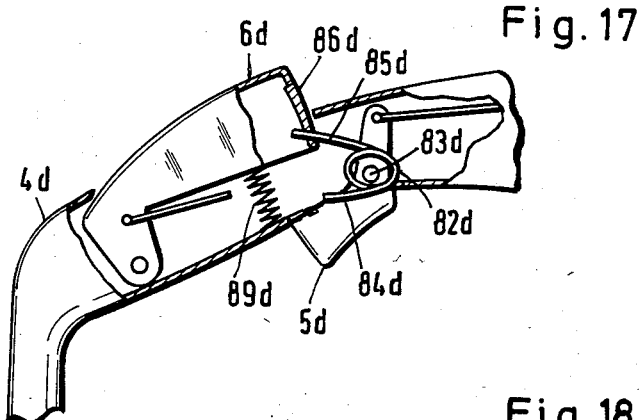
FIG. 17 is part of the rear handle of the chain saw of FIG. 10 equipped with a release member therein which coacts with a throttle lever.

As shown in FIG. 17, the release lever 6d can be made to coact with the throttle lever 5d via a spiral spring 82d. The spiral spring 82d surrounds the axis 83d of the throttle lever 5d and, with leg 84d, presses outwardly against the throttle lever beyond the handle 4d; whereas, the other leg 85d of the spring projects into a slot of an end face wall 86d of the release lever 6d which is not depressed in FIG. 17. when the release lever 6d is depressed against the force of spring 89d and when gas is applied (throttle lever 5d depressed) the free end 87d of the spiral spring 85d latches in a corresponding latching opening 88d in the end wall 86d.

If the release lever 6d is released in this full throttle position 5d, then it cannot rotate into its initial position under the force of the spring since it is latched by the spring leg 85d. This prevents the chain brake from being released under full throttle. Rather, it can be released only at a reduced rotational speed. For a braking action then, the throttle lever 5d must, in every instance, first be released in order to transfer the release lever 6d into the released position shown in FIG. 17. When throttle lever 5d rotates back, the spring leg 85d is pushed out of the latch opening 88d and the release lever 6d is released. Then, the braking arrangement is released in the manner already described.

This configuration ensures that the braking arrangement of the invention will not be released in the full throttle position.

Figure 19:
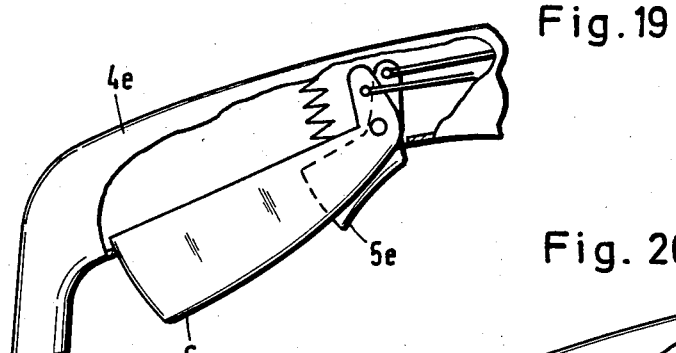
FIG. 19 is a second embodiment of a handle of the chain saw according to FIG. 10 wherein the release member and throttle lever are arranged next to each other and are shown in the unactuated position.
Figure 20:
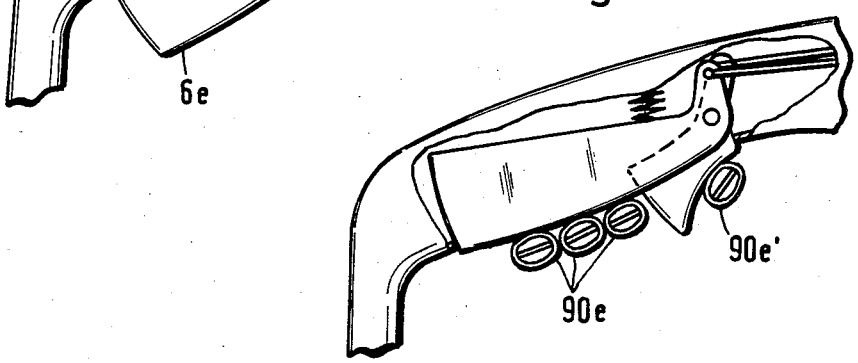
FIG. 20 is a schematic of the handle of FIG. 19 showing the release member and throttle lever in the actuated or depressed position.

In the embodiment according to FIGS. 19 and 20, the release lever 6e is mounted so as to be adjacent and on an axis in the same direction as throttle lever 5e so that it projects downwardly beyond the handle 4e. In this way, the throttle lever 5e and the release lever 6e can be grasped with the fingers 90e of the operator's hand simultaneously whereby the index finger 90e' is on the throttle lever 5e. When the release lever 6e is released, the throttle lever 5e is generally also released so that the throttle is pulled back so that the brake can be released only at reduced rotational speed.

Figure 18:
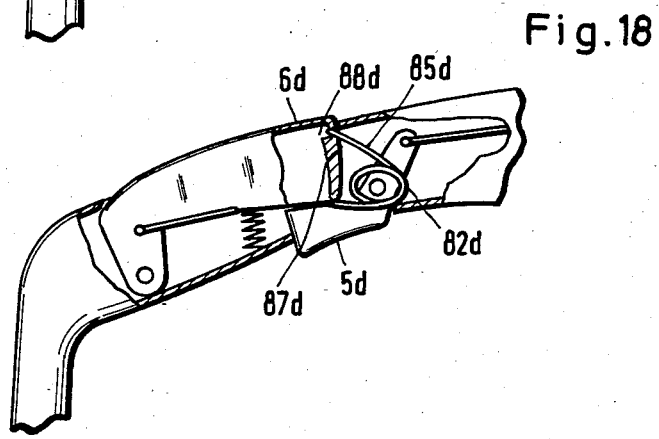
FIG. 18 shows the handle of FIG. 17 with the release member and the throttle lever in the latched position.

With this embodiment of the invention, a latching arrangement corresponding to the embodiment shown in FIGS. 17 and 18 can be provided with a spiral spring between the release lever 6e and the throttle lever 5e.

Figure 21:
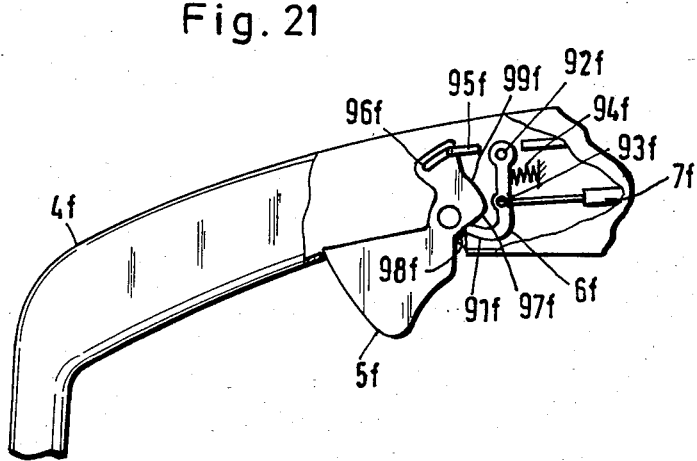
FIG. 21 is a third embodiment of the handle of the chain saw of FIG. 10 wherein the release member lies within the handle and coacts with the throttle lever; and, FIG. 22 shows the handle of FIG. 21 with the release member and throttle lever shown in the actuated position.
Figure 22:
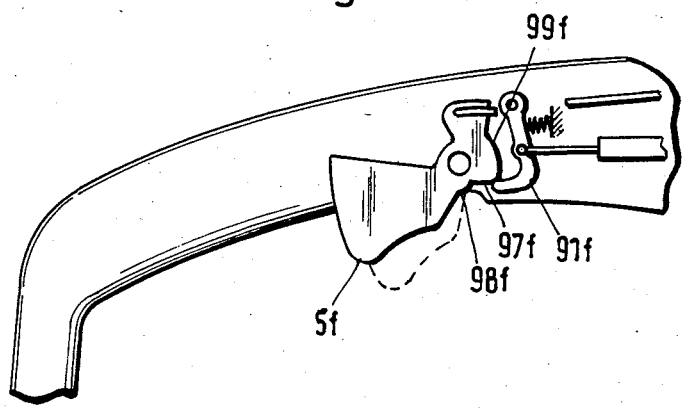

In the embodiment of FIGS. 21 and 22, no separate release lever is provided so that the braking arrangement has to be released with the throttle lever 5f. The throttle lever 5f coacts with a hook-like intermediate member 6f arranged within the handle 4f.

The intermediate lever 6f is pivotally mounted at one end 92f on the handle 4f. A hook-like configuration 92f is provided at the other end of the intermediate lever 6f. The Bowden control cable 7f is pivotally attached to the intermediate lever 6f at the midpoint 93f. Between the pivot location 93f and the end 92f, a compression spring 94f acts upon the intermediate lever 6f between the pivot location 93f and the end 92f. The compression spring 94f holds the lever 6f in its initial position shown in FIG. 21.

A throttle lever rod 95f is hooked into an elongated slot 96f of the throttle lever 5f such that the throttle lever 5f can move freely between its braking position (FIG. 21 and phantom outline of FIG. 22) and the no-load position (shown in solid lines in FIG. 22) with respect to the throttle lever rod 95f. Only after this free motion is overcome, can the throttle lever rod 95f be actuated by pressing the throttle lever 5f. As FIGS. 21 and 22 show, the intermediate lever 6f lies, between the braking position and the no-load position, with its hook end 91f on a step 97f between a first curved edge segment 98f and a second curved edge segment 99f of the throttle lever 5f. The edge segment 99f has a substantially larger radius of curvature than does the curved segment 98f and both segments are curved so that they correspond to segments of the circumference of a circle.

The intermediate lever 6f lies on the edge segment 99f when the throttle lever 5f is pivoted beyond the no-load position shown in FIG. 22. So long as the intermediate lever 6f is braced on edge segment 99f, it will not be pivotally rotated with an actuation of the throttle lever 5f since the axis of curvature of the edge segment 99f is the pivot axis of the throttle lever. Therefore, no displacement forces will function on the Bowden control cable 7f so that the braking arrangement cannot be actuated. The braking arrangement will only then be released and the brake drum only then braked when the throttle lever 5f is pivotally rotated from the no-load position (FIG. 22) into the braking position (FIG. 21) since the hook end 91f of the intermediate lever 6f is pivoted toward the one side corresponding to the width of the step 97f. Therefore, the throttle lever 5f must be pivotally rotated into the no-load position (FIG. 22) to lift the brake of the chain saw.

As a consequence of this configuration, also in this embodiment of the invention, it is assured that the brake will be released only at low rotational speeds and not in the full load position. This release operation proceeds in the same manner as described for the previous embodiments according to FIGS. 17 to 20.

It is understood that the foregoing description is that of the preferred embodiments of the invention and that various changes and modifications may be made thereto without departing from the spirit and scope of the invention as defined in the appended claims.

What is claimed is:

1. A brake arrangement for a chain saw having a housing and a guide bar mounted on the housing for accommodating a saw chain thereon, the chain saw also having a drive mqtor mounted in the housing, the brake arrangement comprising:
a brake drum operatively connected to the saw chain;
a brake band disposed in surrounding relationship to said brake drum;
a brake member connected to said brake band and being pivotally mounted on the housing for movement between a ready position whereat said brake band is disposed in spaced relationship to said brake drum and a released position whereat said brake band is drawn tightly around said brake drum;
a brake spring connected to said brake member for resiliently biasing said brake member in a direction to cause said brake member to pull said brake band tightly about said brake drum when said brake member is in said released position;
latching means for holding said brake member in said ready position against the force of said brake spring; said latching means including a tensioning member pivotally mounted on said housing;
cam means connected to the drive motor for rotational movement through a predetermined path; and,
release means operatively connected to said latching means for opening the same to permit rotational movement of said brake member to said released position in response to a first actuation of said release means and for releasing said tensioning member in response to a second actuation of said release means for movement of said tensioning member into said path after said brake member is in said released position in which path said tensioning member follows said cam means in a movement that causes said tensioning member to again coact with said latching means to return said brake member to said ready position and to reclose said latching means whereby the latter again holds said brake member in said ready position against the force of said brake spring.

2. The braking arrangement of claim 1, said tensioning member being a spring-biased, two-arm tensioning lever pivotally mounted to the housing and having a first end portion on one arm thereof; said latching means including: an intermediate lever having first and second end portions; said second end portion being pivotally connected to said brake member, said first end portions conjointly defining an openable joint connection means which together with said levers conjointly define an extended position thereof in the course of movement of said joint connection means to and from a rest position disposed to one side of said extended position; said latching means holding said brake member in said ready position when said joint connection means is in said rest position; and, said latching means further including an actuating lever for holding said joint connection means in said rest position, said actuating lever being operatively connected to said release means.

3. The braking arrangement of claim 2, said latching means including: a lug-like latch formed on said first end portion of said tensioning lever so as to project laterally therefrom; and, latch receiving means formed on said actuating lever for releasably receiving said lug-like latch therein, said latch receiving means defining a first holding surface for holding said lug-like latch and said tensioning lever in said rest position of said joint connection means until said actuating lever is actuated by said release means and a second holding surface for holding said tensioning lever from jumping into said path of said cam means until said actuating lever is again actuated by said release means.

4. The braking arrangement of claim 3, the motor having a drive shaft, and said cam means being a cam mounted to a drive piece driven by the drive shaft of the motor.

5. The braking arrangement of claim 4, said latching means including tensioning lever spring means for rotating said tensioning lever away from said rest position after said release means is actuated for the first time whereby said joint connection means opens and said intermediate lever is released therefrom.

6. The braking arrangement of claim 5, said latching means further including intermediate lever spring means for spring loading the latter in the direction of said rest position; and, said cam means being configured to impart a movement to said tensioning lever after the latter jumps into said path upon release from said second holding surface so as to cause said first portion of said tensioning lever to pivot said intermediate lever into said intermediate spring means thereby spring loading the latter in the direction of said rest position, said cam means defining a cam surface for contact engaging said tensioning lever and having a curvature selected to ensure that the torque applied at said cam surface to said tensioning lever to retension the latter and return it to said rest position remains constant.

7. The braking arrangement of claim 6 said actuating lever being eccentrically journalled about a pivot axis on the housing so as to cause the direction of the force applied at the contact interface of said first holding surface and said lug-like latch to define a moment arm with respect to said pivot axis of said actuating lever.

8. A brake arrangement for a chain saw having a housing and a guide bar mounted on the housing for accommodating a saw chain thereon, the chain saw also having a drive motor mounted in the housing, the brake arrangement comprising:
a brake drum operatively connected to the saw chain;
a brake band disposed in surrounding relationship to said brake drum;
a brake member connected to said brake band and being pivotally mounted on the housing for movement between a ready position whereat said brake band is disposed in spaced relationship to said brake drum and a released position whereat said brake band is drawn tightly around said brake drum;

a brake spring connected to said brake member for resiliently biasing said brake member in a direction to cause said brake member to pull said brake band tightly about said brake drum when said brake member is in said released position;

cam means connected to the drive motor for rotational movement through a predetermined path;

latching means for holding said brake member in said ready position against the force of said brake spring; said latching means including: a tensioning member pivotally mounted on said housing; and, biasing means for resiliently biasing said tensioning member for movement in a predetermined direction;

said latching means further including openable joint connection means for connecting said tensioning member and said brake member to each other in a rest position; and, an actuating member pivotally mounted on the housing for movement between a first position whereat said actuating member holds said joint connection means in said rest position thereby holding said brake member in said ready position and a second position whereat said openable joint connection means has opened. to release said brake member for movement into said released position and to permit movement of said tensioning member to an other position on said actuating member spaced from said rest position whereat said tensioning member is held out of said path of said cam means;

a hand-guard lever pivotally mounted on the housing for movement between an initial position and an end position, said hand-guard lever being operatively connected to said actuating member for moving the latter from said first position to said second position whereby said brake member is released and said brake band is tightly applied to said brake drum; and, release means operatively connected to said actuating member for acting thereupon to release said tensioning member from said other position thereby causing the latter to enter into said path wherein said tensioning member follows said cam means in a movement that causes said tensioning member to again coact with said latching means to reclose said joint connection means and return said brake member to said ready position thereby lifting said brake band from said brake drum.

9. The brake arrangement of claim 8, said actuating member having abutment means formed thereon; and, said hand-guard lever being a one-piece lever having an arm for engaging said abutment means and causing said actuating member to move to said second position.

10. The brake arrangement of claim 9, said abutment means comprising: a recess formed in said actuating member; and, an abutment plate mounted in said recess to define a wall thereof and so as to protrude at approximately a right angle from said actuating member; said arm of said hand-guard lever extending into said recess for coacting with said abutment plate; said tensioning member being a two-arm lever having a first end portion with a roller mounted thereon and a second end portion for coacting with said cam means; and, said actuating member having a surface edge of which a portion thereof defines an opening formed in the actuating member for coacting with said roller.

11. The brake arrangement of claim 10, resilient biasing means for biasing said hand-guard lever in said initial position and in said end position.

12. The brake arrangement of claim 11, said resilient biasing means comprising: a second arm formed on said hand-guard lever, an ancillary lever pivotally connected to said second arm for conjointly defining a knee lever therewith; and, a spring connecting said ancillary lever to the housing for resiliently loading said knee lever.

13. The brake arrangement of claim 9, said hand-guard lever having a further arm for engaging said brake member and returning the same to said ready position thereof when said hand-guard lever is returned from said end position to said initial position.

14. The brake arrangement of claim 8, said release means including stop means for holding said actuating member in said second position against the force applied thereto by said resiliently biased tensioning member.

15. The brake arrangement of claim 14, said release means including disengaging means for disengaging said stop means to permit said actuating member to rotate under the force of said tensioning member.

16. The brake arrangement of claim 14, said stop means including: first step-like recess means formed in said actuating member; and, leaf-spring means for engaging said step-like recess means for holding said actuating member in said second position.

17. The braking arrangement of claim 16, said release means including disengaging means for disengaging said stop means to permit said actuating member to rotate under the force of said tensioning member; said disengaging means including:

second step-like recess means formed in the edge of said actuating member;

a switching member pivotally mounted so as to slidably engage a curved segment of the edge of said actuating member for movement to said second step-like recess means;

abutment means arranged on the edge of said switching member to project outwardly therefrom and to face said second step-like recess means;

said switching member being disposed so as to cause said abutment means to lie against said second step-like recess means when said actuating member is in said first position; and, actuator means for actuating said switching member to move along said curved segment of said actuating member for disengaging said leaf-spring means from said first step-like recess means.

18. The brake arrangement of claim 17, the chain saw having a throttle lever pivotally mounted on a handle of the chain saw for movement between a full-throttle position and a released position, said actuator means comprising: a release lever pivotally mounted in said handle of the chain saw for movement between a disengage position and an engage position; and, a pull member connecting said release lever to said switching member for actuating said switching member to disengage said leaf-spring means from said first-mentioned step-like recess when said release lever is released into said disengage position; and, the brake arrangement further including: locking means for locking said release lever in said engage position when said throttle lever is in said full-throttle position.

19. The brake arrangement of claim 18, said locking means comprising: lock aperture means formed in said release lever; and, a spring mounted in the handle and having an end for engaging said lock aperture means when said throttle lever and said release lever are in said full-throttle and said engage positions, respectively, so as to lock said release lever in said engage position so long as said throttle-lever is in said full-throttle position.

20. The braking arrangement of claim 19, said release lever and said throttle lever being pivotally mounted in and on the same side of said handle so as to be mutually adjacent and to be disposed along respective axes extending in the same direction whereby an operator can manually grasp both levers with the same hand.

21. The brake arrangement of claim 8, the chain saw having a throttle lever pivotally mounted on a handle of the chain saw for movement from a braking position to a no-load position and then to a full-throttle position, said release means comprising:
- an intermediate lever operatively connected to said throttle lever for movement between a first position and a second position corresponding to the movement of said throttle lever between said braking position and said no-load position; and,
- actuation means for acting upon said actuating member in response to a movement of said intermediate lever to said first position thereof to cause said actuating member to move to its second position thereby Opening said openable joint connection means and releasing said brake member; and,
- means for maintaining said intermediate lever in said second position thereof during movement of said throttle lever between said no-load and said full-throttle positions.

22. The brake arrangement of claim 21, said intermediate lever being pivotally mounted in said handle; said throttle lever defining a contact engagement surface having a predetermined cam-like contour for movement relative to said intermediate lever as said throttle lever is moved between said braking position and said full-load throttle position; resilient means for biasing one end of said intermediate lever against said contact engagement surface; said surface having a contour so that the movement between said no-load and said full-throttle positions imparts no movement to said intermediate lever; whereas, said contact engagement surface having a contour so that movement between said braking position and said no-load position causes said intermediate lever to move between said first and second positions thereof.

23. A brake arrangement for a chain saw having a housing and a guide bar mounted on the housing for accommodating a saw chain thereon, the chain saw also having a drive motor mounted in the housing, the brake arrangement comprising:
- a brake drum operatively connected to the saw chain;
- a brake band disposed in surrounding relationship to said brake drum;
- a brake member connected to said brake band and being pivotally mounted on the housing for movement between a ready position whereat said brake band is disposed in spaced relationship to said brake drum and a released position whereat said brake band is drawn tightly around said brake drum;
- a brake spring connected to said brake member for resiliently biasing said brake member in a direction to cause said brake member to pull said brake band tightly about said brake drum when said brake member is in said released position;
- latching means for holding said brake member in said ready position against the force of said brake spring; said latching means including a tensioning member pivotally mounted on said housing;
- said latching means further including openable joint connection means for connecting said tensioning member and said brake member to each other in a rest position to hold said brake member in said ready position; and, an actuating member pivotally mounted on the housing for movement between a first position whereat said actuating member holds said joint connection means in said rest position to a second position to cause said openable joint means to release said brake member thereby permitting the latter to move into said released position thereof and to release and hold said tensioning member at a position spaced from said rest position,
- cam means connected to the drive motor for rotational movement through a predetermined path;
- a hand-guard lever pivotally mounted on the housing between an initial position and an end position, said hand-guard lever being operatively connected to said actuating member for moving the latter from said first position thereof corresponding to said initial position to said second position thereof corresponding to said end position whereby said brake member is released and said brake band is tightly applied to said brake drum; and,
- said hand-guard lever being returnable to said initial position thereby causing said actuating member to be returned to said first position thereof and said tensioning member to be displaced from said position spaced from said rest position thereby causing the latter to enter into said path wherein said tensioning member follows said cam means in a movement that causes said tensioning member to again coact with said latching means to return said brake member to said ready position and reclose said joint connection means whereby the latter again holds said brake member in said ready position thereof against the force of said brake spring.

24. The brake arrangement of claim 23, said actuating member having abutment means formed thereon; and, said hand-guard lever being a one-piece lever having an arm for engaging said abutment means and causing said actuating member to move to said second position.

* * * * *

UNITED STATES PATENT AND TRADEMARK OFFICE
CERTIFICATE OF CORRECTION

PATENT NO. : 4,594,780

DATED : June 17, 1986

INVENTOR(S) : H. Schliemann et al

It is certified that error appears in the above-identified patent and that said Letters Patent is hereby corrected as shown below:

On the first page of the patent, at the end of the Abstract: delete "24 Drawing Figures" and substitute -- 22 Drawing Figures -- therefor.

In column 6, line 12: delete "point" and substitute -- joint -- therefor.

In column 8, line 56: delete "anytime" and substitute -- any time -- therefor.

In column 9, line 40: delete "roler" and substitute -- roller -- therefor.

In column 11, line 51: delete "and 12b," and substitute -- band 12b, -- therefor.

UNITED STATES PATENT AND TRADEMARK OFFICE
CERTIFICATE OF CORRECTION

PATENT NO. : 4,594,780

DATED : June 17, 1986

INVENTOR(S) : H. Schliemann et al

It is certified that error appears in the above-identified patent and that said Letters Patent is hereby corrected as shown below:

In column 11, line 68: delete the term "the end 58b" which appears in italics and substitute -- the end 58b -- therefor.

In column 12, line 10: add a comma after the term "lever 8b".

In column 14, lines 47 and 48: delete "20c. However, this rotational movement lever 21c" and substitute -- 20c disengages from the intermediate lever 21c -- therefor.

In column 15, line 59: delete "17. when" and substitute -- 17. When -- therefor.

UNITED STATES PATENT AND TRADEMARK OFFICE
CERTIFICATE OF CORRECTION

PATENT NO. : 4,594,780
DATED : June 17, 1986
INVENTOR(S) : H. Schliemann et al

It is certified that error appears in the above-identified patent and that said Letters Patent is hereby corrected as shown below:

In column 17, line 23: delete "mqtor" and substitute -- motor -- therefor.

In column 18, line 51: add a comma after "claim 6".

In column 19, line 27: delete the period after the word "opened".

In column 21, line 29: delete "thereby Opening" and substitute -- thereby opening -- therefor.

In column 22, line 29: delete "rest position," and substitute -- rest position; -- therefor.

Signed and Sealed this

Ninth Day of September 1986

[SEAL]

Attest:

DONALD J. QUIGG

Attesting Officer

Commissioner of Patents and Trademarks